(12) United States Patent
Wang et al.

(10) Patent No.: US 9,049,687 B2
(45) Date of Patent: Jun. 2, 2015

(54) SYSTEM AND METHOD FOR PROVIDING MULTICAST AND/OR BROADCAST SERVICES

(75) Inventors: Chun-Yen Wang, Tainan (TW); Chun-Yuan Chiu, Pingtung (TW)

(73) Assignee: Industrial Technology Research Institute, Hsinchu (TW)

( * ) Notice: Subject to any disclaimer, the term of this patent is extended or adjusted under 35 U.S.C. 154(b) by 1239 days.

(21) Appl. No.: 12/432,256

(22) Filed: Apr. 29, 2009

(65) Prior Publication Data

US 2009/0274085 A1 Nov. 5, 2009

Related U.S. Application Data

(60) Provisional application No. 61/071,531, filed on May 5, 2008.

(51) Int. Cl.
*H04H 20/71* (2008.01)
*H04W 72/00* (2009.01)

(52) U.S. Cl.
CPC .................................. *H04W 72/005* (2013.01)

(58) Field of Classification Search
CPC .................................................. H04W 72/005
USPC ........................................................ 370/312
See application file for complete search history.

(56) References Cited

U.S. PATENT DOCUMENTS

| 7,436,764 | B2 | 10/2008 | Lee et al. | |
|---|---|---|---|---|
| 7,436,811 | B2 * | 10/2008 | Putcha et al. | 370/343 |
| 7,561,880 | B2 * | 7/2009 | Moon et al. | 455/436 |
| 7,616,611 | B2 * | 11/2009 | Hwang et al. | 370/336 |
| 7,826,859 | B2 * | 11/2010 | Lee et al. | 455/458 |
| 7,848,726 | B2 * | 12/2010 | Kato | 455/307 |
| 8,081,587 | B2 * | 12/2011 | Beckmann et al. | 370/310 |
| 8,098,741 | B2 * | 1/2012 | Suh et al. | 375/240.27 |
| 8,099,093 | B2 * | 1/2012 | Peng | 455/424 |
| 8,428,042 | B1 * | 4/2013 | Chion et al. | 370/347 |
| 8,467,329 | B2 * | 6/2013 | Lee et al. | 370/312 |
| 8,526,373 | B2 * | 9/2013 | Ishii et al. | 370/329 |
| 8,705,437 | B2 * | 4/2014 | Cai | 370/328 |

(Continued)

FOREIGN PATENT DOCUMENTS

| CN | 1731884 | 2/2006 |
|---|---|---|
| EP | 1799003 | 6/2007 |

(Continued)

OTHER PUBLICATIONS

3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8) 3GPP TS 36.300, V8.4.0, Mar. 2008.

(Continued)

*Primary Examiner* — Guang Li
(74) *Attorney, Agent, or Firm* — Jianq Chyun IP Office

(57) ABSTRACT

A method for a base station to provide a multicast and/or broadcast service (MBS) in a communication system. The method includes: transmitting system information on a system control information block (SCIB); transmitting MBS control information that is changed with relatively high frequency on a secondary multicast/broadcast control information block (S-MCIB); and transmitting MBS content data based on the MBS control information.

32 Claims, 11 Drawing Sheets

(56) References Cited

U.S. PATENT DOCUMENTS

| | | | |
|---|---|---|---|
| 2004/0228294 A1* | 11/2004 | Kim et al. | 370/312 |
| 2005/0153715 A1* | 7/2005 | Hwang et al. | 455/458 |
| 2006/0035644 A1* | 2/2006 | Niwano et al. | 455/450 |
| 2006/0094441 A1* | 5/2006 | Beckmann et al. | 455/455 |
| 2006/0098569 A1* | 5/2006 | Han et al. | 370/208 |
| 2006/0126590 A1 | 6/2006 | Putcha et al. | |
| 2008/0152029 A1* | 6/2008 | Kwon et al. | 375/260 |
| 2008/0242224 A1* | 10/2008 | Fratti et al. | 455/3.06 |
| 2008/0259842 A1* | 10/2008 | Cai | 370/328 |
| 2008/0276287 A1* | 11/2008 | Mizuta | 725/62 |
| 2008/0280631 A1* | 11/2008 | Lee et al. | 455/458 |
| 2008/0285668 A1* | 11/2008 | Lee et al. | 375/260 |
| 2009/0067377 A1* | 3/2009 | Talukdar et al. | 370/329 |
| 2009/0221293 A1* | 9/2009 | Petrovic et al. | 455/450 |
| 2010/0015969 A1* | 1/2010 | Lee et al. | 455/422.1 |
| 2010/0085867 A1* | 4/2010 | Ji et al. | 370/216 |
| 2010/0091750 A1* | 4/2010 | Lee et al. | 370/338 |
| 2010/0105390 A1* | 4/2010 | Ishii | 455/436 |
| 2010/0128649 A1* | 5/2010 | Gonsa et al. | 370/312 |
| 2010/0173578 A1* | 7/2010 | Wang et al. | 455/3.01 |
| 2011/0003600 A2* | 1/2011 | Beckmann et al. | 455/455 |

FOREIGN PATENT DOCUMENTS

| | | |
|---|---|---|
| EP | 2051410 | 4/2009 |
| TW | 200723802 | 6/2007 |
| WO | 2005117444 | 12/2005 |

OTHER PUBLICATIONS

Draft Standard for Local and metropolitan area networks, Part 16: Air Interface for Broadband Wireless Access Systems, P802.16/Rev2/D4 (Apr. 2008).

Office Communication for Application No. 09251256.5, from the European Patent Office, dated Oct. 28, 2013.

\* cited by examiner

SYSTEM AND METHOD FOR PROVIDING MULTICAST AND/OR BROADCAST SERVICES

RELATED APPLICATIONS

This application is based upon and claims the benefit of priority from U.S. Provisional Patent Application No. 61/071,531, filed May 5, 2008, the entire contents of which are incorporated herein by reference.

FIELD OF THE INVENTION

This invention pertains in general to systems and methods for provide multicast and/or broadcast services (MBSs).

BACKGROUND

Wireless communications operating according to a predetermined protocol have gained worldwide popularity. The features of the wireless medium include the capacity to address broad geographic areas without expensive infrastructure development such as running cables. The broadband wireless access industry may be based on, for example, Institute of Electrical and Electronics Engineers (IEEE) 802.16 family of standards.

A wireless communication system may include one or more base stations (BSs), and one or more subscriber stations (SSs). A base station may be any type of communication device configured to transmit data to, and/or receive data from, one or more subscriber stations in the wireless communication system. In some applications, a base station may be referred to as, for example, a Node-B, a base transceiver system (BTS), an access point, a home Node-B, a femto-cell base station, etc. In other applications, a base station may be referred to as a relay station, an intermediate node, or an intermediary. A base station may have a broadcast/reception range within which the base station may wirelessly communicate with one or more subscriber stations. The broadcast/reception range may vary due to power levels, locations, interferences, etc.

A subscriber station may be any type of communication device configured to wirelessly transmit data to, and/or receive data from, a base station in the wireless communication system. A subscriber station may be, for example, a server, a client, a desktop computer, a laptop computer, a network computer, a workstation, a personal digital assistant (PDA), a tablet personal computer (PC), a scanner, a telephony device, a pager, a camera, a television, a hand-held video game device, a musical device, etc. In addition, a subscriber station may include one or more wireless sensors in a wireless sensor network configured to perform centralized and/or distributed communication. In some applications, a subscriber station may be a mobile computing device. In other applications, a subscriber station may be a fixed computing device operating in a mobile environment, such as a bus, a train, an airplane, a boat, a car, etc.

The IEEE 802.16 family of standards support a multicast and/or broadcast service (MBS), also known as a multimedia broadcast multicast service (MBMS), which can provide content data to a plurality of users who desire to receive the same service in a communication network. For example, the content data may be movies, games, files, software programs, or TV programs, and is usually provided by one or more content providers. A subscriber station may subscribe to an MBS. As a result, the subscriber station may receive MBS data that includes MBS control information and content data, through access to one or more base stations in the communication network. In addition to the IEEE 802.16 family of standards, standards promulgated by 3rd Generation Partnership Project (3GPP), which is a collaboration of certain standards development organizations, may also support MBSs. The 3GPP standards may include the Universal Mobile Telecommunication System (UMTS) standard, the High-Speed Uplink Packet Access (HSUPA) standard, the Evolved High-Speed Packet Access (HSPA Evolution) standard, the Long Term Evolution (LTE) standard, the LTE Advanced standard, etc.

Typically, MBSs may be provided based on single-cell transmission or multi-cell transmission. FIG. 1 illustrates a schematic block diagram of a conventional communication system 100 for providing MBSs based on a single-cell transmission mode, also known as a single-BS access mode. The communication system 100 may include a plurality of base stations each serving a cell. For convenience of illustration, first and second base stations 102 and 104 are shown in FIG. 1. The base stations 102 and 104 serve first and second cells 106 and 108, respectively.

Based on the single-cell transmission mode, base stations provide MBSs independently, and a subscriber station in a cell only receives signals including MBS data from a base station serving that cell. For example, a subscriber station 110 in the cell 106 only receives signals from the base station 102 to receive an MBS. Also for example, a subscriber station 112 in the cell 108 only receives signals from the base station 104 to receive an MBS.

FIG. 2 illustrates a schematic block diagram of a conventional communication system 200 for providing MBSs based on a multi-cell transmission mode, also known as a multi-BS access mode. The communication system 200 may include a plurality of base stations each serving a cell. For convenience of illustration, first and second base stations 202 and 204 are shown in FIG. 2. The base stations 202 and 204 serve first and second cells 206 and 208, respectively. The cells 206 and 208 may have an overlapped area covered by both the base stations 202 and 204.

Based on the multi-cell transmission mode, base stations, e.g., the base stations 202 and 204, participating in multi-cell transmission may be coordinated in advance and transmit multicast signals at substantially the same time. In such situation, a subscriber station, e.g., a subscriber station 210, 212, or 214, may receive signals including the same MBS data from the base stations 202 and 204. This may improve reliability of the received signals.

In addition, a base station may provide one or more MBSs in parallel. Moreover, some of the MBSs may be provided based on single-cell transmission, and other ones of the MBSs may be provided based on multi-cell transmission.

SUMMARY

According to a first aspect of the present disclosure, there is provided a method for a base station to provide a multicast and/or broadcast service (MBS) in a communication system, comprising: transmitting system information on a system control information block (SCIB); transmitting MBS control information that is changed with relatively high frequency on a secondary multicast/broadcast control information block (S-MCIB); and transmitting MBS content data based on the MBS control information.

According to a second aspect of the present disclosure, there is provided a base station to provide a multicast and/or broadcast service (MBS) in a communication system, comprising: a processor, the processor being configured to: determine system information for transmission on a system control information block (SCIB); and determine MBS control information that is changed with relatively high frequency for transmission on a secondary multicast/broadcast control information block (S-MCIB).

According to a third aspect of the present disclosure, there is provided a method for a base station to provide a multicast and/or broadcast service (MBS) in a communication system, wherein the base station includes at least first and second radio frequency (RF) carriers, the method comprising: transmitting system information on a system control information block (SCIB) on the first RF carrier; transmitting MBS control information that is changed with relatively high frequency on a secondary multicast/broadcast control information block (S-MCIB) on the second RF carrier; and transmitting MBS content data on the second RF carrier based on the MBS control information.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention as recited in the appended claims.

In exemplary embodiments, there are provided systems and methods for providing multicast and/or broadcast services (MBSs), also known as multimedia broadcast multicast services (MBMSs). Based on the methods, MBS control information may be transmitted on different types of logical channels, such as multicast/broadcast control information blocks (MCIBs). The MBS control information may include physical channel configuration information (e.g., modulation and/or coding parameters), schedule and/or resource allocation information for MBS control information and/or content data, session start and/or stop indicators, radio bearer information (e.g., quality of service parameters), counting parameters for counting a number of subscriber stations receiving an MBS in a cell, retransmission parameters, MBS zone boundary parameters, feedback channel configuration information, mapping information of multicast connection identifiers (MCIDs), etc. The MBS control information may be changed or updated during transmission of signals by a base station to a subscriber station.

Figure 1:
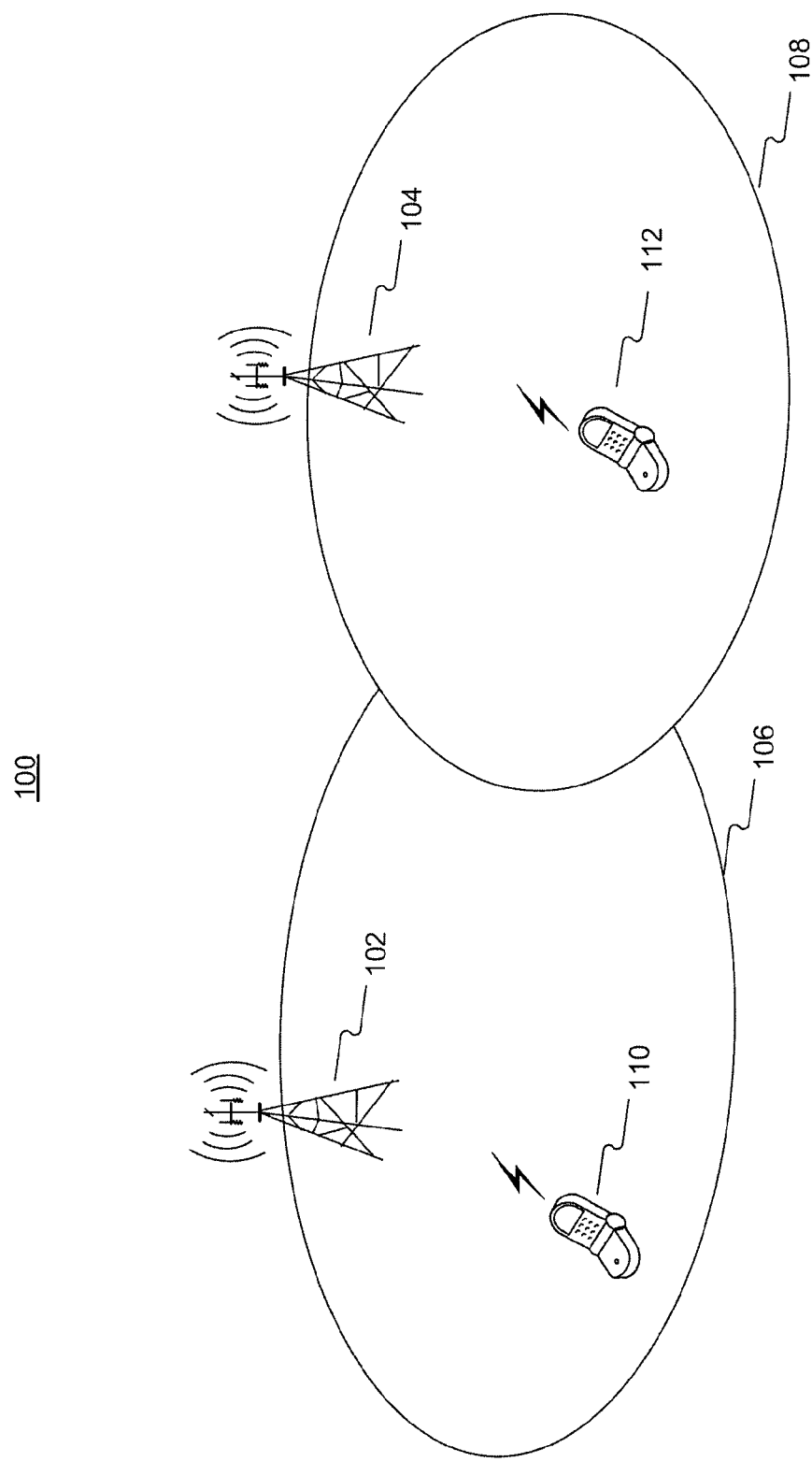
FIG. 1 illustrates a schematic block diagram of a conventional communication system for providing MBSs based on single-cell transmission.
Figure 2:
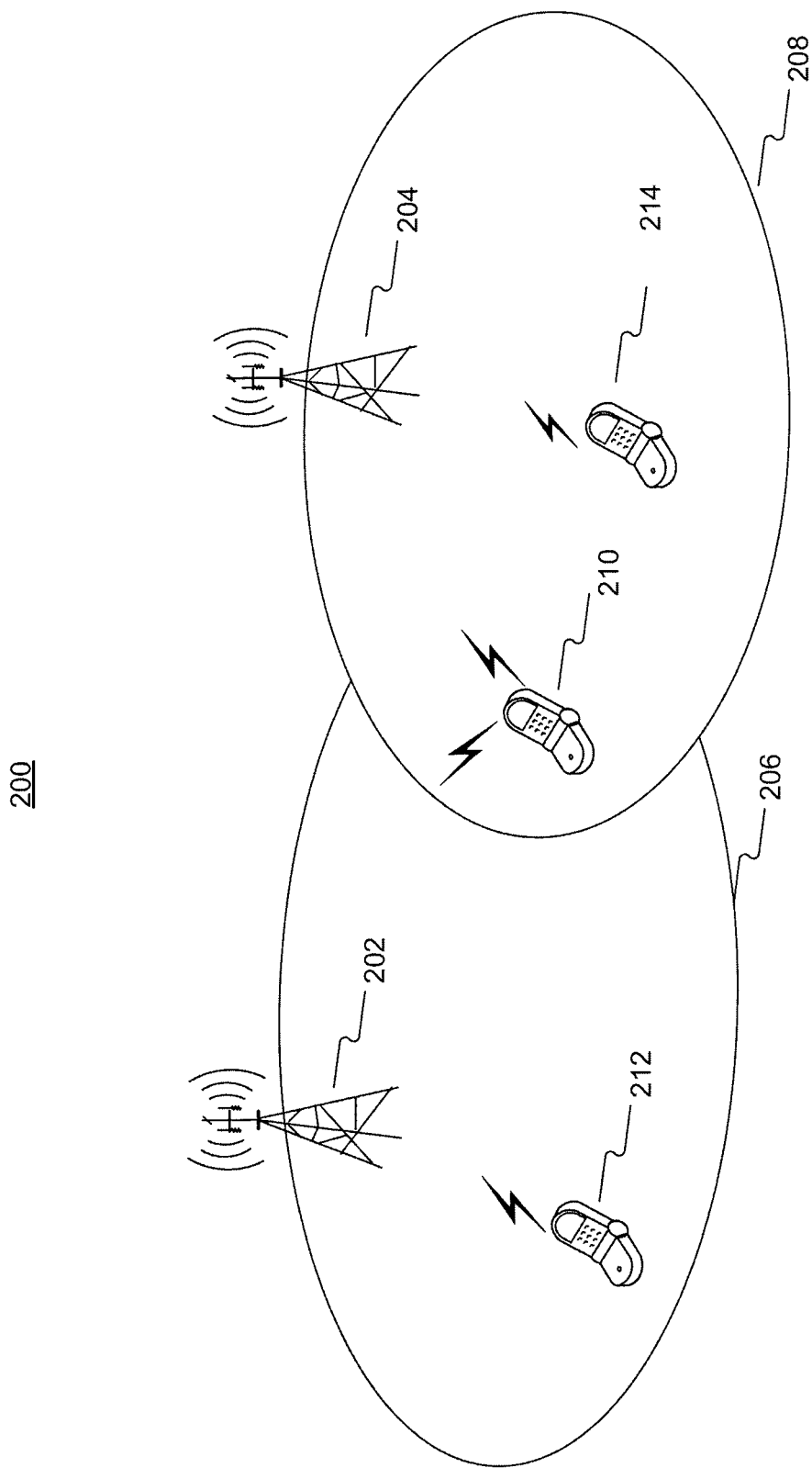
FIG. 2 illustrates a schematic block diagram of a conventional communication system for providing MBSs based on multi-cell transmission.
Figure 3:
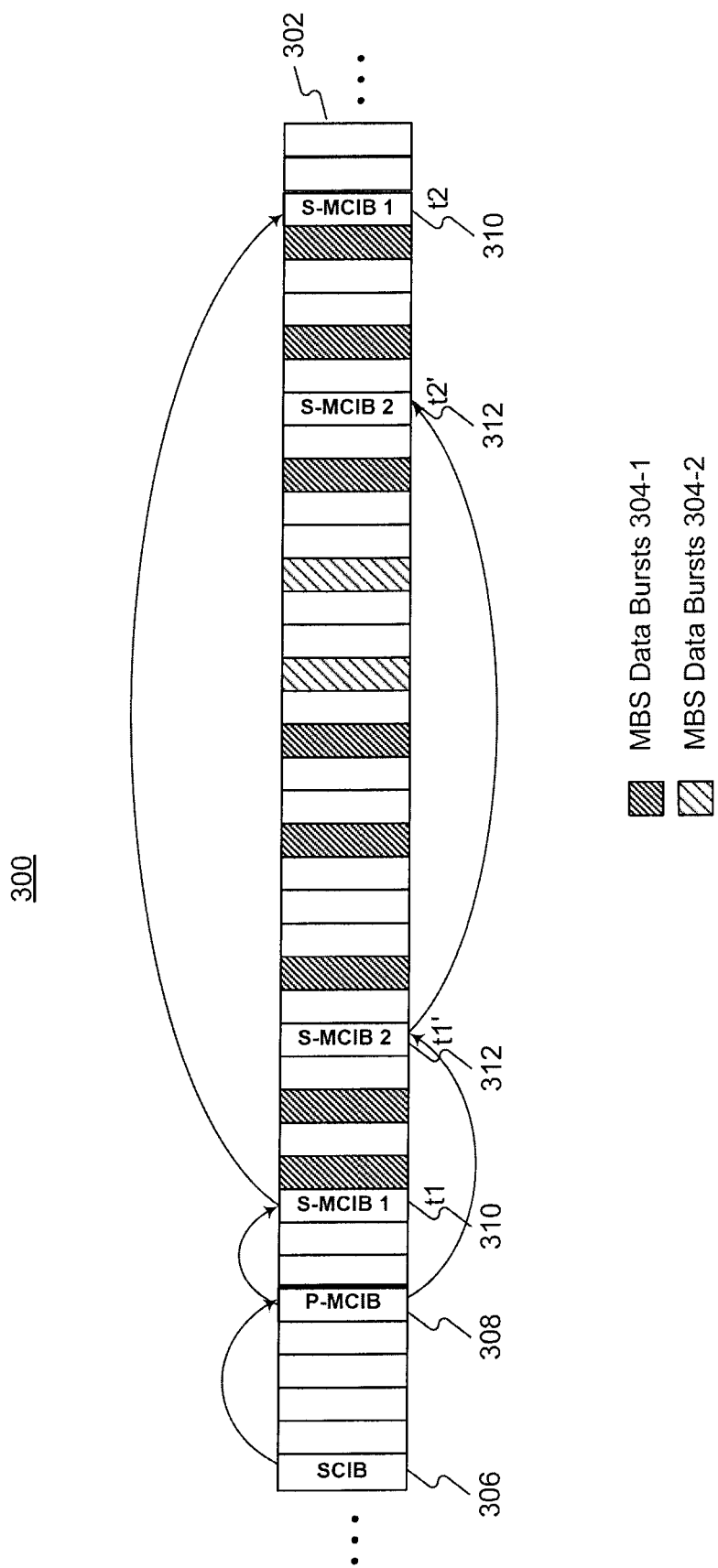
FIG. 3 illustrates a method for a base station to provide MBSs in a communication system, according to an exemplary embodiment.

FIG. 3 illustrates a method 300 for a base station to provide MBSs in a communication system, according to an exemplary embodiment. For example, the base station may transmit signals 302 including, e.g., downlink control messages and MBS data, in data frames. A subscriber station may receive the signals 302 and, hence, read the MBS data in order to receive an MBS. For illustrative purposes only, only MBS data bursts 304-1 and 304-2 representing content data of first and second MBSs, respectively, are shown in FIG. 3. For example, the first MBS may be a service providing television programs. Also for example, the second MBS may be a service providing on-line games. The first and second MBSs are each provided based on single-cell transmission or multi-cell transmission.

In exemplary embodiments, the base station may transmit the signals 302 on a plurality of logical channels, i.e., information blocks, including, e.g., a system control information block (SCIB) 306, a primary multicast/broadcast control information block (P-MCIB) 308, and first and second secondary multicast/broadcast control information blocks (S-MCIBs) 310 (i.e., S-MCIB 1) and 312 (i.e., S-MCIB 2) for the first and second MBSs, respectively. The P-MCIB 308 may be transmitted based on single-cell transmission or multi-cell transmission.

In exemplary embodiments, system information that may be needed by subscriber stations served by the base station, whether or not to receive an MBS, to access to wireless networks may be transmitted on an SCIB, such as the SCIB 306. In some embodiments, the SCIB 306 may not contain detailed or specific information regarding an MBS, but may contain schedule information for MCIBs such as the P-MCIB 308. In the illustrated embodiment shown in FIG. 3, an arrow pointing from a first channel to a second channel is used to illustrate that the first channel may contain schedule information for the second channel. Therefore, based on the SCIB 306, the subscriber station may be able to determine when and/or where to read the P-MCIB 308. In other embodiments, the SCIB 306 may contain MBS control information that would otherwise be transmitted on the P-MCIB 308. In such embodiments, the MBS may not need the P-MCIB 308. Alternatively, the SCIB 306 and the P-MCIB 308 are multiplexed based on, e.g., frequency division multiplexing (FDM), time division multiplexing (TDM), code division multiplexing (CDM), media access control (MAC) layer multiplexing, etc, and/or are transmitted together within the same resource, e.g., a subframe. In such embodiments, the SCIB 306 may not provide schedule information for the P-MCIB 308.

In exemplary embodiments, MBS control information that is changed or updated with relatively low frequency, referred to herein as semi-static parameters, may be transmitted on a P-MCIB, such as the P-MCIB 308, and MBS control information that is changed or updated with relatively high frequency, referred to herein as dynamic parameters, may be transmitted on an S-MCIB, such as the S-MCIB 310 or 312. For example, modulation and/or coding parameters, session start/stop indicators, radio bearer information, retransmission parameters, feedback channel configuration information, MCID mapping information, and counting parameters for counting a number of subscriber stations receiving an MBS in a cell may be semi-static parameters and, hence, may be transmitted on the P-MCIB 308. Also for example, schedule information for incoming MBS data bursts may be dynamic parameters and, hence, may be transmitted on the S-MCIB. Alternatively, a P-MCIB, e.g., the P-MCIB 308, may include all MBS control information for an MBS. In such situation, that MBS may not need an S-MCIB.

In exemplary embodiments, MBSs provided by the base station may share the P-MCIB 308. In some embodiments, semi-static parameters for the MBSs may be transmitted on the P-MCIB 308. In addition, the P-MCIB 308 may contain schedule information for S-MCIBs, such as the S-MCIBs 310 and 312. In other words, based on the P-MCIB 308, the subscriber station may be able to determine when and/or where to read the S-MCIB 310 or 312. In other embodiments, all MBS control information for the MBSs may be transmitted on the P-MCIB 308 and, hence, the P-MCIB 308 may also contain schedule information for MBS data bursts, such as the MBS data bursts 304-1 or 304-2.

In exemplary embodiments, the S-MCIBs 310 and 312 may be transmitted by using transmission modes, e.g., the single-cell transmission mode or the multi-cell transmission mode, of the first and second MBSs, respectively, and may be used to transmit dynamic parameters for the first and second MBSs, respectively. For example, the S-MCIBs 310 and 312 contain schedule information for incoming MBS data bursts 304-1 and 304-2, respectively. Based on information transmitted on the S-MCIB 310 or 312, the subscriber station may be able to determine when and/or where to read the MBS data bursts 304-1 or 304-2 to receive the first or second MBS. Also for example, an S-MCIB, e.g., the S-MCIB 310, at a first time t1 may contain schedule information for the S-MCIB at a second or next time t2. Therefore, for example, based on the S-MCIB 310 at t1, the subscriber station may be able to determine when and/or where to read the S-MCIB 310 at t2. Similarly, based on the S-MCIB 312 at a first time t1', the subscriber station may be able to determine when and/or where to read the S-MCIB 312 at a second or next time t2'. In addition, the S-MCIBs 310 and 312 may include a P-MCIB change indicator, based on which the subscriber station may be able to determine whether MBS control information for the first and/or second MBSs transmitted on the P-MCIB 308 is changed or updated. Furthermore, in order to reduce service switching time, e.g., TV channel switching time, it is optional that the S-MCIB 310 for the first MBS may contain schedule information for the S-MCIB 312 for the second MBS (not shown).

In one exemplary embodiment, an S-MCIB may be multiplexed based on, e.g., FDM, TDM, CDM, MAC layer multiplexing, etc., and/or be transmitted together with its corresponding data bursts within the same resource, e.g., a subframe (not shown). In such embodiment, an S-MCIB at a first time may not contain schedule information for the S-MCIB at a second or next time, because the S-MCIB at the first time may provide schedule information for incoming MBS data bursts, in which the S-MCIB at the second or next time may appear (not shown). Similarly, in such embodiment, a P-MCIB may not contain schedule information for the S-MCIB, but provide schedule information for incoming MBS data bursts, in which the S-MCIB may appear.

In addition, in the illustrated embodiment, one S-MCIB is designated for one MBS. For example, the S-MCIBs 310 and 312 are designated for the first and second MBSs, respectively. Alternatively, however, a plurality of MBSs may share one S-MCIB. For example, a plurality of MBSs are multiplexed and/or transmitted together in one or more common resources, e.g., based on MBS multiplexing.

When the subscriber station wants to receive, e.g., the first MBS, the subscriber station may search for a first available SCIB to read. In one exemplary embodiment, the subscriber station may read the SCIB 306 for system information for receiving the first MBS and/or schedule information for the P-MCIB 308. The subscriber station may then read the P-MCIB 308 for MBS control information including schedule information for the S-MCIB 310. In another exemplary embodiment, the SCIB 306 may contain MBS control information that would otherwise be transmitted on the P-MCIB 308. Therefore, the subscriber station may read the SCIB 306 to obtain MBS control information including schedule information for the S-MCIB 310. The subscriber station may further read the S-MCIB 310 at t1 and the MBS data bursts 304-1 corresponding to the S-MCIB 310 at t1, and read the S-MCIB 310 at t2 and the MBS data bursts (not shown) corresponding to the S-MCIB 310 at t2. Similarly, the subscriber station may continue to read the S-MCIB 310 at following times and the corresponding MBS data bursts (not shown). As the S-MCIB→data→S-MCIB→data . . . process continues, the subscriber station may receive the first MBS.

In one exemplary embodiment, when the subscriber station reads an S-MCIB, such as the S-MCIB 310 at t2, and identifies that a P-MCIB change indicator is set or an error occurs, the subscriber station may be able to determine that information transmitted on the P-MCIB 308 is changed or updated. Accordingly, the subscriber station may search for a next available SCIB to read. After the subscriber station reads the next available SCIB and its corresponding P-MCIB so as to update MBS control information, the subscriber station may continue the S-MCIB→data→S-MCIB→data . . . process to receive the first MBS. In another embodiment, when a subscriber station reads an S-MCIB, such as the S-MCIB 310 at t2, and identifies that a P-MCIB change indicator is set, that S-MCIB may already include updated MBS control information. In such embodiment, the subscriber station may update MBS control information from the S-MCIB directly and continue the S-MCIB→data→S-MCIB→data . . . process to receive an MBS without a need to read a next available SCIB and/or its corresponding P-MCIB to update MBS control information.

In exemplary embodiments, the subscriber station may encounter errors when receiving an SCIB, a P-MCIB, and/or an S-MCIB. In such embodiments, the subscriber station may restart the above process, i.e., read a next available SCIB and its corresponding P-MCIB, and then continue the S-MCIB→data→S-MCIB→data . . . process to receive an MBS.

In exemplary embodiments, an SCIB at different times may contain schedule information for a P-MCIB to be transmitted at a next time. As described above, a P-MCIB may contain schedule information for an S-MCIB at a first time, which may further contain schedule information for the S-MCIB at a second or next time. Optionally, the P-MCIB may contain schedule information for the S-MCIB at the second or next time.

Figure 4:
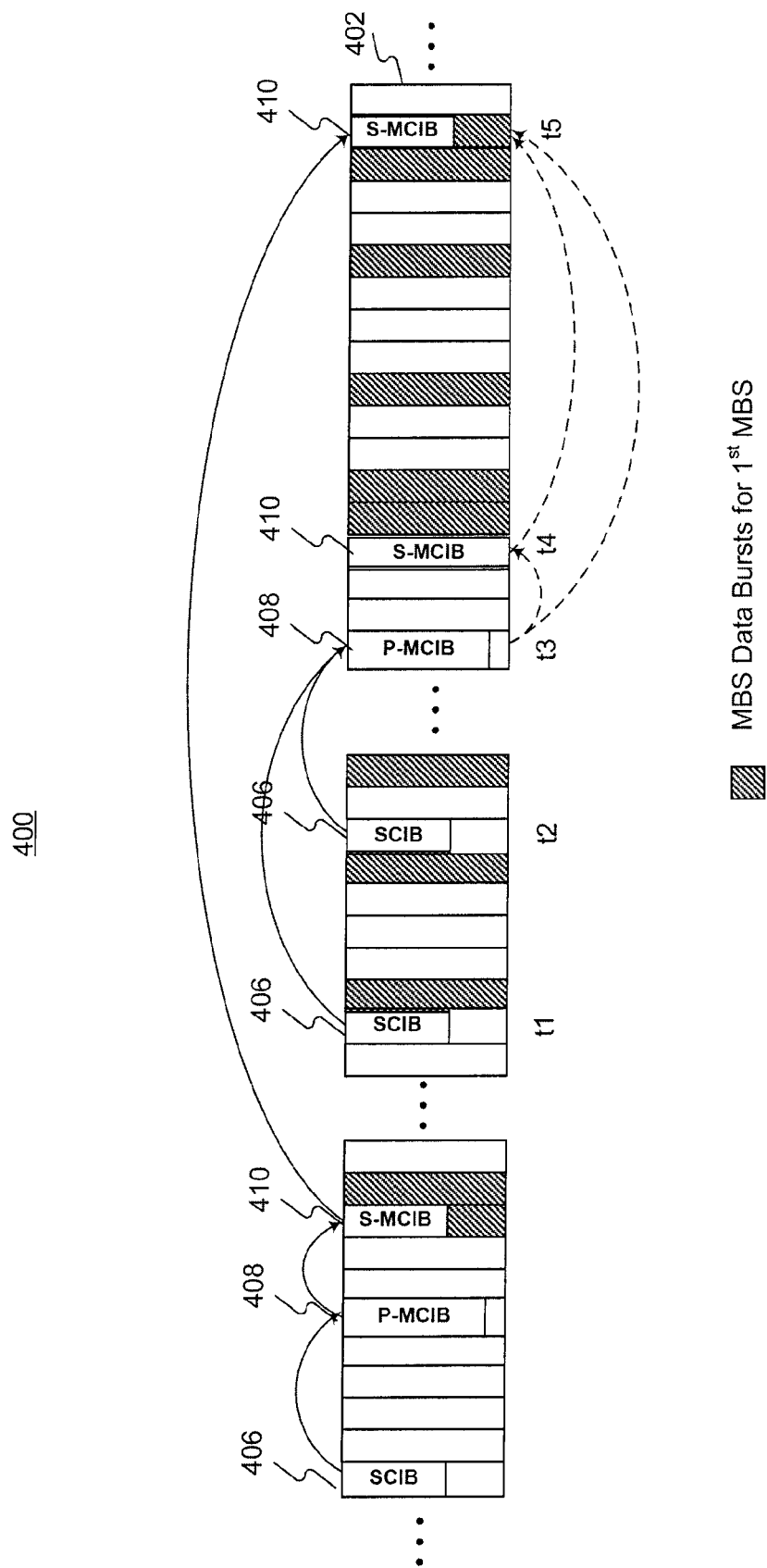
FIG. 4 illustrates a method for a base station to provide MBSs in a communication system, according to an exemplary embodiment.

In the illustrated embodiment in FIG. 3, appearance periods, e.g., scheduling periods or inter-arrival times, of an SCIB, a P-MCIB, and an S-MCIB may be the same. In such situation, there is one SCIB, i.e., the SCIB 306, containing schedule information for a P-MCIB, i.e., the P-MCIB 308, and one P-MCIB, i.e., the P-MCIB 308, containing scheduling information for S-MCIBs, e.g., the S-MCIB 310 and the S-MCIB 312. In another exemplary embodiment, the appearance periods of those channels may not be the same, as illustrated in FIG. 4 below. In addition, an SCIB, a P-MCIB, or an S-MCIB may not occupy a whole subframe resource.

FIG. 4 illustrates a method 400 for a base station to provide MBSs in a communication system, according to an exemplary embodiment. The base station may transmit the signals 402 including, e.g., downlink control messages and MBS data, on a plurality of logical channels, i.e., information blocks, including, e.g., a system control information block (SCIB) 406, a primary multicast/broadcast control information block (P-MCIB) 408, and a secondary multicast/broadcast control information block (S-MCIB) 410 for a first MBS. The SCIB 406, the P-MCIB 408, and the S-MCIB 410 operate in a manner similar to the SCIB 306, the P-MCIB 308, and the S-MCIB 310 (FIG. 3), respectively. In the illustrated embodiment shown in FIG. 4, an arrow pointing from a first channel to a second channel is used to illustrate that the first channel may contain schedule information for the second channel.

For example, referring to FIG. 4, an appearance period of the SCIB 406 is shorter than an appearance period of the P-MCIB 408, which is shorter than an appearance period of the S-MCIB 410. Therefore, the SCIB 406 at both first and second times t1 and t2 contains schedule information for the P-MCIB 408 transmitted at a third time t3. The P-MCIB 408 at t3 contains schedule information for the S-MCIB 410 at a fourth time t4, which further contains schedule information for the S-MCIB 410 at a fifth time t5. Alternatively, the P-MCIB 408 at t3 may contain schedule information for the S-MCIB 410 at t5. The above-described exemplary alternatives are represented by the dashed arrows in FIG. 4.

Figure 5:
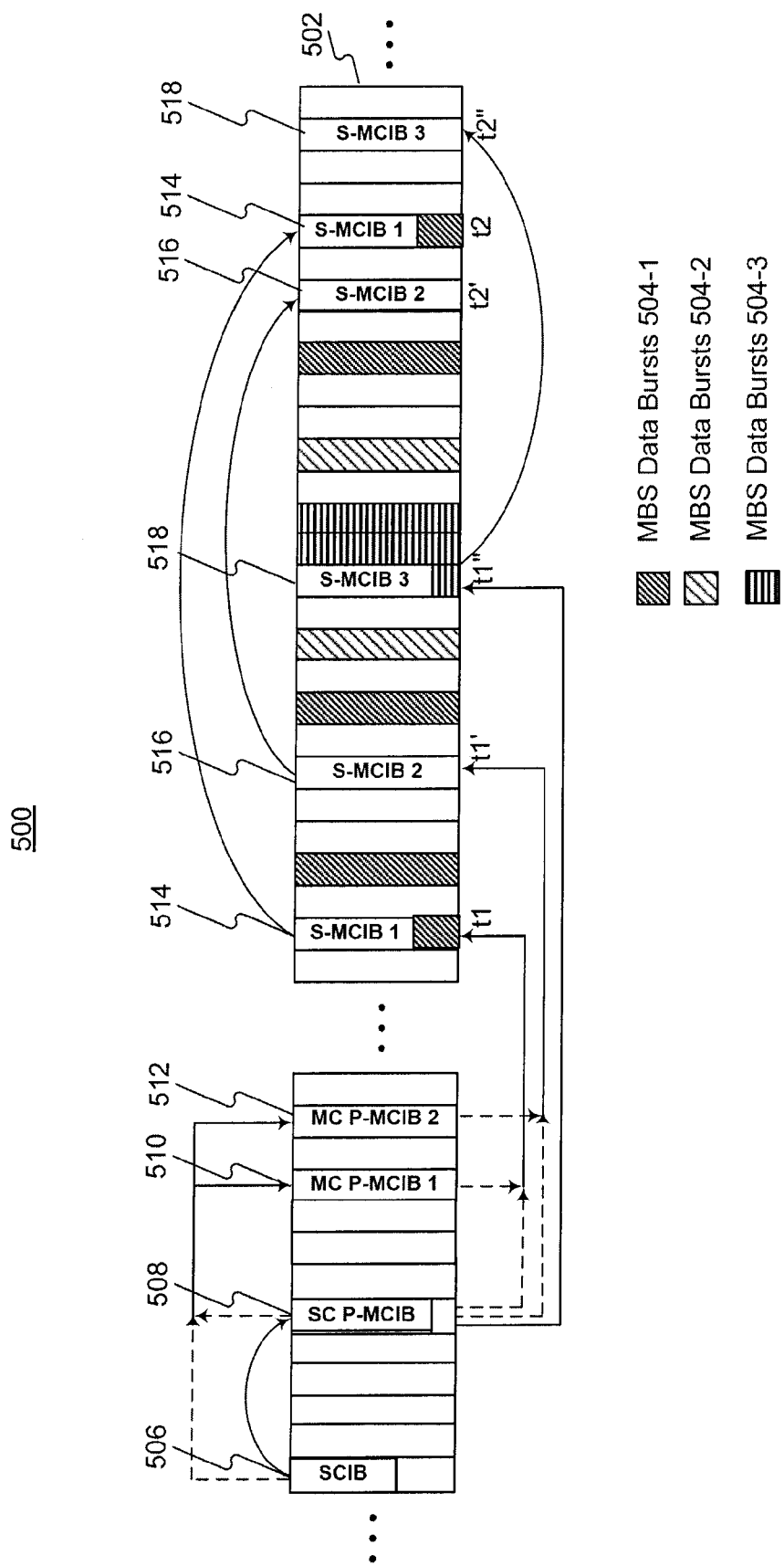
FIG. 5 illustrates a method for a base station to provide MBSs in a communication system, according to an exemplary embodiment.

FIG. 5 illustrates a method 500 for a base station to provide MBSs in a communication system, according to an exemplary embodiment. For example, the base station may transmit signals 502 including, e.g., downlink control messages and MBS data, in data frames. A subscriber station may receive the signals 502 and, hence, read the MBS data in order to receive an MBS. For illustrative purposes only, only MBS data bursts 504-1, 504-2, and 504-3 representing content data of first, second, and third MBSs, respectively, are shown in FIG. 5. It is also assumed that the first and second MBSs are each provided based on multi-cell transmission, and the third MBS may be provided based on single-cell transmission or multi-cell transmission.

In exemplary embodiments, the base station may transmit the signals 502 on a plurality of logical channels, i.e., information blocks, including, e.g., a system control information block (SCIB) 506, a single-cell primary multicast/broadcast control information block (SC P-MCIB) 508, first and second multi-cell primary multicast/broadcast control information blocks (MC P-MCIBs) 510 (i.e., MC P-MCIB 1) and 512 (i.e., MC P-MCIB 2), and first, second, and third secondary multicast/broadcast control information blocks (S-MCIBs) 514 (i.e., S-MCIB 1), 516 (i.e., S-MCIB 2), and 518 (i.e., S-MCIB 3) for the first, second, and third MBSs, respectively. The SC P-MCIB 508 is transmitted based on single-cell transmission, and the MC P-MCIBs 510 and 512 are transmitted based on multi-cell transmission. The S-MCIB 514, 516, or 518 is transmitted based on the transmission mode of its corresponding MBS. Furthermore, an MBS, e.g., the third MBS, may not have an MC P-MCIB. In this situation, that MBS may operate in a manner similar to the method 300 (FIG. 3).

In exemplary embodiments, system information that may be needed by subscriber stations served by the base station, whether or not to receive an MBS, to access to wireless networks may be transmitted on an SCIB, such as the SCIB 506. In some embodiments, the SCIB 506 may not contain detailed or specific information regarding an MBS, but may contain schedule information for the SC P-MCIB 508. In the illustrated embodiment shown in FIG. 5, an arrow pointing from a first channel to a second channel is used to illustrate that the first channel may contain schedule information for the second channel. Therefore, based on the SCIB 506, the subscriber station may be able to determine when and/or where to read the SC P-MCIB 508. In other embodiments, the SCIB 506 may contain MBS control information that would otherwise be transmitted on the SC P-MCIB 508. Alternatively, the SCIB 506 and the P-MCIB 508 may be multiplexed and/or transmitted together within the same resource, e.g., a subframe. In such embodiments, the MBS may not need the SC P-MCIB 508 and, hence, the SCIB 506 may not provide the schedule information for the P-MCIB 508.

In exemplary embodiments, the SCIB 506 may contain schedule information for the MC P-MCIBs 510 and 512. Therefore, based on the SCIB 506, the subscriber station may be able to determine when and/or where to read the MC P-MCIB 510 or 512. In addition, the SC P-MCIB 508 may contain schedule information for the MC P-MCIBs 510 and 512. Therefore, based on the SC P-MCIB 508, the subscriber station may be able to determine when and/or where to read the MC P-MCIB 510 or 512. These exemplary alternatives are represented by the dashed arrows in FIG. 5.

In exemplary embodiments, MBS control information that is changed or updated with relatively low frequency, referred to herein as semi-static parameters, may be transmitted on an SC P-MCIB or an MC P-MCIB, such as the SC P-MCIB 508, the MC P-MCIB 510, or the MC P-MCIB 512. MBS control information that is changed or updated with relatively high frequency, referred to herein as dynamic parameters, may be transmitted on an S-MCIB, such as the S-MCIB 514, 516, or 518.

Furthermore, MBS control information may be divided into cell-specific and non-cell-specific MBS control information. Cell-specific and non cell-specific MBS control information may be transmitted on an SC P-MCIB, such as the SC P-MCIB 508, and only non-cell-specific MBS control information may be transmitted on an MC P-MCIB, such as the MC P-MCIB 510 or 512. Cell-specific MBS control information typically includes control parameters that are associated with a specific cell served by the base station. For example, MBS zone boundary parameters, feedback channel configuration information, and counting parameters for counting a number of subscriber stations receiving an MBS in a cell may be considered as cell-specific MBS control information. Non-cell-specific MBS control information typically includes control parameters that are associated with multiple cells served by a plurality of base stations including the above-noted base station, wherein the plurality of base stations may provide an MBS based on multi-cell transmission. For example, modulation and coding parameters, schedule information for S-MCIBs transmitted based on multi-cell transmission, session start/stop indicators, radio bearer information, etc, may be considered as non-cell-specific MBS control information. In one exemplary embodiment, cell-specific MBS control information may also be transmitted on the SCIB 506.

In exemplary embodiments, MBSs provided by the base station may share the SC P-MCIB 508. For example, semi-static parameters for the MBSs may be transmitted on the SC P-MCIB 508. Also for example, the SC P-MCIB 508 may contain schedule information for S-MCIBs, such as the S-MCIB 518 for the third MBS based on single-cell transmission. In other words, based on the SC P-MCIB 508, the subscriber station may be able to determine when and/or where to read the S-MCIB 518. It is also optional for the SC P-MCIB 508 to contain schedule information for MBS data bursts, such as the MBS data bursts 504-1, 504-2, and 504-3. As a result, an MBS provided based on single-cell transmission, such as the third MBS, may not need an MC P-MCIB or an S-MCIB.

In exemplary embodiments, the SC P-MCIB 508 may contain schedule information for S-MCIBs, such as the S-MCIBs 514 and 516, respectively, for the first and second MBSs, based on multi-cell transmission. In other words, based on the SC P-MCIB 508, the subscriber station may be able to determine when and/or where to read the S-MCIB 514 or 516. As a result, an MBS provided based on multi-cell transmission, such as the first or second MBS, may not need an MC P-MCIB. In such situation, that MBS may operate in a manner similar to the method 300 (FIG. 3).

In exemplary embodiments, the SC P-MCIB 508 may contain schedule information for an MC P-MCIB, e.g., the MC P-MCIB 510 or 512. Therefore, for example, based on the SC P-MCIB 508, the subscriber station may be able to determine when and/or where to read the MC P-MCIB 510 for the first MBS and to determine when and/or where to read the MC P-MCIB 512 for the second MBS.

In exemplary embodiments, the MC P-MCIBs 510 and 512 may contain schedule information for the S-MCIBs 514 and 516, respectively. In other words, based on the MC P-MCIB 510, the subscriber station may be able to determine when and/or where to read the S-MCIB 514 for the first MBS and, based on the MC P-MCIB 512, the subscriber station may be able to determine when and/or where to read the S-MCIB 516 for the second MBS. As a result, an MBS provided based on multi-cell transmission, such as the first or second MBS, may not need an SC P-MCIB. In such situation, the MBS may operate in a manner similar to the method 300 (FIG. 3).

In exemplary embodiments, the SCIB 506 may contain schedule information for an MC P-MCIB, e.g., the MC P-MCIB 510 or 512, which may contain schedule information for the S-MCIB 514 or 516. Therefore, for example, based on the SCIB 506, the subscriber station may be able to determine when and/or where to read the MC P-MCIB 510 for the first MBS and to determine when and/or where to read the MC P-MCIB 512 for the second MBS. The subscriber station may further determine when and/or where to read the S-MCIB 514 or 516 based on the MC P-MCIB 510 or 512. The above-described exemplary alternatives are represented by the dashed arrows in FIG. 5.

In exemplary embodiments, the S-MCIBs 514, 516, and 518 may be used to transmit dynamic parameters for the first, second, and third MBSs, respectively. For example, the S-MCIBs 514, 516, and 518 may contain schedule information for one or more incoming MBS data bursts, e.g., the MBS data bursts 504-1, 504-2, and 542-3, respectively. Based on information transmitted on an S-MCIB, e.g., the S-MCIB 514, the subscriber station may be able to determine when and/or where to read the MBS data bursts 504-1 to receive the first MBS. Also for example, an S-MCIB, e.g., the S-MCIB 514, at a first time t1 contains schedule information for the S-MCIB at a second or next time t2. Therefore, for example, based on the S-MCIB 514 at t1, the subscriber station may be able to determine when and/or where to read the S-MCIB 514 at t2. Similarly, based on the S-MCIB 516 at a first time t1', the subscriber station may be able to determine when and/or where to read the S-MCIB 516 at a second or next time t2' and, based on the S-MCIB 518 at a first time t1", the subscriber station may be able to determine when and/or where to read the S-MCIB 518 at a second or next time t2". In addition, in order to reduce service switching time, e.g., TV channel switching time, it is optional that, e.g., the S-MCIB 514 for the first MBS may contain schedule information of the S-MCIB 516 for the second MBS.

In addition, an S-MCIB may include a change indicator based on which the subscriber station may be able to determine whether MBS control information transmitted on an SC P-MCIB and/or an MC P-MCIB is changed or updated. For example, the S-MCIB 514 may include a change indicator, based on which the subscriber station may be able to determine whether MBS control information of the first MBS transmitted on the SC P-MCIB 508 and/or the MC P-MCIB 510 is changed or updated.

Alternatively, an S-MCIB may include multiple change indicators. For example, the S-MCIB 514 may include an SC P-MCIB change indicator, based on which the subscriber station may be able to determine whether MBS control information transmitted on the SC P-MCIB 508 is changed or updated, and an MC P-MCIB change indicator, based on which the subscriber station may be able to determine whether MBS control information transmitted on the MC P-MCIB 510 is changed or updated.

In one exemplary embodiment, an S-MCIB may be multiplexed based on e.g., FDM, TDM, CDM, MAC layer multiplexing, etc, and/or be transmitted together with its corresponding data bursts within the same resource, e.g., a subframe (not shown). In such embodiment, an S-MCIB at a first time may not contain schedule information for the S-MCIB at a second or next time, because the S-MCIB at the first time may provide schedule information for incoming MBS data bursts, in which the S-MCIB at the second or next time may appear (not shown). Similarly, in such embodiment, an SC P-MCIB and/or an MC P-MCIB may not contain schedule information for the S-MCIB, but provide schedule information for incoming MBS data bursts, in which the S-MCIB may appear.

In addition, in the illustrated embodiment, one MC P-MCIB is designated for one MBS. For example, the MC P-MCIBs 510 and 512 are designated for the first and second MBSs, respectively. Optionally, however, a plurality of MBSs may share one MC P-MCIB. For example, a plurality of MBSs are multiplexed and/or transmitted together in one or more common resources, e.g., based on MBS multiplexing. Also, in the illustrated embodiment, one S-MCIB is designated for one MBS. For example, the S-MCIBs 514, 516, and 518 are designated for the first, second and third MBSs, respectively. In one exemplary embodiment, however, a plurality of MBSs may share one S-MCIB. For example, a plurality of MBSs are multiplexed and/or transmitted together in one or more common resources, e.g., based on MBS multiplexing.

When the subscriber station wants to receive, e.g., the first MBS, the subscriber station may search for a first available SCIB to read. In one exemplary embodiment, the subscriber station may read the SCIB 506 for system information for receiving the first MBS and/or schedule information for the SC P-MCIB 508. The subscriber station may then read the SC P-MCIB 508 for MBS control information including schedule information for the MC P-MCIB 510. In another exemplary embodiment, the SCIB 506 may contain MBS control information that would otherwise be transmitted on the SC P-MCIB 508. Therefore, the subscriber station may read the SCIB 506 to obtain MBS control information including schedule information for the MC P-MCIB 510. The subscriber station may then read the MC P-MCIB 510 for additional MBS control information including schedule information for the S-MCIB 514. Still in another exemplary embodiment, the subscriber station may read the SCIB 506, which may contain schedule information for the SC P-MCIB 508 and the MC P-MCIB 510. The subscriber station may then read the SC P-MCIB 508 for MBS control information and read the MC P-MCIB 510 for additional MBS control information. At least one of the SC P-MCIB 508 and the MC P-MCIB 510 may include schedule information for the S-MCIB 514. The subscriber station may further read the S-MCIB 514 at t1 and the MBS data bursts 504-1 corresponding to the S-MCIB 514 at t1, and read the S-MCIB 514 at t2 and the MBS data bursts (not shown) corresponding to the S-MCIB 514 at t2. Similarly, the subscriber station may continue to read the S-MCIB 514 at following times and corresponding MBS data bursts (not shown). As the S-MCIB→data→S-MCIB→data . . . process continues, the subscriber station may receive the first MBS.

In exemplary embodiments, when the subscriber station wants to receive an MBS which does not have an MC P-MCIB, e.g., the third MBS, the subscriber station may search for a first available SCIB to read. In one exemplary embodiment, the subscriber station may read the SCIB 506 for system information for receiving the third MBS and/or schedule information for the SC P-MCIB 508. The subscriber station may then read the SC P-MCIB 508 for MBS control information including schedule information for the S-MCIB 518. In another exemplary embodiment, the SCIB 506 may already contain MBS control information that would otherwise be transmitted on the SC P-MCIB 508. Therefore, the subscriber station may read the SCIB 506 to obtain MBS control information including schedule information for the S-MCIB 518. The subscriber station may further read the S-MCIB 518 at t1" and the MBS data bursts 504-3 corresponding to the S-MCIB 518 at t1", and read the S-MCIB 518 at a second or next time t2" and the MBS data bursts (not shown) corresponding to the S-MCIB 518 at t2". Similarly, the subscriber station may continue to read the S-MCIB 518 at following times and corresponding MBS data bursts (not shown). As the S-MCIB→data→S-MCIB→data . . . process continues, the subscriber station may receive the third MBS.

In exemplary embodiments (not shown), when the subscriber station wants to receive an MBS which does not have an SC P-MCIB, the subscriber station may search for a first available SCIB to read. For example, the subscriber station may read the SCIB for schedule information for an MC P-MCIB. The subscriber station may then read the MC P-MCIB for MBS control information including schedule information for an S-MCIB. The subscriber station may further read the S-MCIB at a first time t1''' and MBS data bursts corresponding to the S-MCIB at t1''', and read the S-MCIB at a second or next time t2''' and MBS data bursts corresponding to the S-MCIB at t2'''. Similarly, the subscriber station may continue to read the S-MCIB at following times and corresponding MBS data bursts. As the S-MCIB→data→S-MCIB→data . . . process continues, the subscriber station may receive the MBS.

In one exemplary embodiment, when the subscriber station reads an S-MCIB, such as the S-MCIB 514 at the second time, and identifies that a change indicator is set or an error occurs, the subscriber station may be able to determine that information transmitted on the SC P-MCIB 508 and/or the MC P-MCIB 510 is changed. Accordingly, the subscriber station may search for a next available SCIB to read. After the subscriber station reads the next available SCIB and its corresponding SC P-MCIB and/or MC P-MCIB so as to update the MBS control information, the subscriber station may continue the S-MCIB→data→S-MCIB→data . . . process to receive the first MBS. Alternatively, when the subscriber station reads an S-MCIB, such as the S-MCIB 514 at t2, and identifies that a P-MCIB change indicator is set, the S-MCIB may already include updated P-MCIB information. In such situation, the subscriber station may update the MBS control information from the S-MCIB directly and continue the S-MCIB→data→S-MCIB→data . . . process to receive the MBS without a need to read the next available SCIB and/or its corresponding P-MCIB to update the control information.

In exemplary embodiments, the subscriber station may encounter errors when receiving an SCIB, an SC P-MCIB, an MC P-MCIB, and/or an S-MCIB. In such embodiments, the subscriber station may restart the above process, i.e., read a next available SCIB and its corresponding SC P-MCIB and/or MC P-MCIB, and then continue the S-MCIB→data→S-MCIB→data . . . process to receive the MBS.

In exemplary embodiments, an SCIB at different times may contain schedule information for an SC P-MCIB or MC P-MCIB to be transmitted at a next time. As described above, an SC P-MCIB or MC P-MCIB may contain schedule information for an S-MCIB at a first time, which may further contain schedule information for the S-MCIB at a second or next time. Optionally, the SC P-MCIB or MC P-MCIB may contain schedule information for the S-MCIB at the second or next time.

In one exemplary embodiment, appearance periods, e.g., scheduling periods or inter-arrival times, of an SCIB, an SC P-MCIB, an MC P-MCIB, and an S-MCIB may be the same. In another exemplary embodiment, the appearance periods of those channels may not be the same. In addition, an SCIB, an SC P-MCIB, an MC P-MCIB, or an S-MCIB may not occupy a whole subframe resource.

Figure 6:
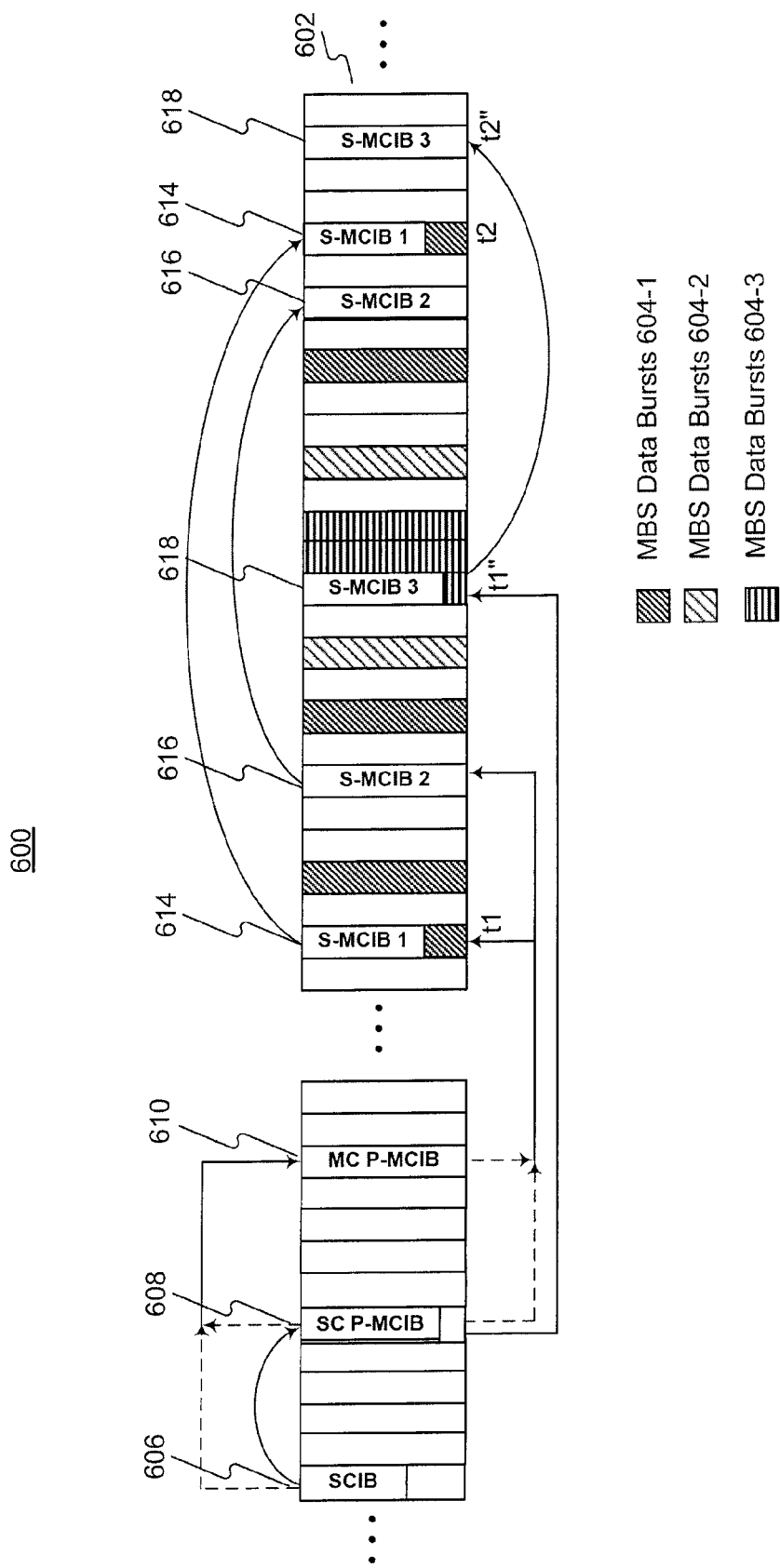
FIG. 6 illustrates a method for a base station to provide MBSs in a communication system, according to an exemplary embodiment.

FIG. 6 illustrates a method 600 for a base station to provide MBSs in a communication system, according to an exemplary embodiment. For example, the base station may transmit signals 602, including, e.g., downlink control messages and MBS data, in data frames. A subscriber station may receive the signals 602 and, hence, read the MBS data in order to receive an MBS. For illustrative purposes only, only MBS data bursts 604-1, 604-2, and 604-3 representing content data of first, second, and third MBSs, respectively, are shown in FIG. 6. It is also assumed that the first and second MBSs are each provided based on multi-cell transmission, and the third MBS is provided based on single-cell or multi-cell transmission.

In exemplary embodiments, the base station may transmit the signals 602 on a plurality of logical channels, i.e., information blocks, including, e.g., a system control information block (SCIB) 606, a single-cell primary multicast/broadcast control information block (SC P-MCIB) 608, a multi-cell primary multicast/broadcast control information block (MC P-MCIB) 610, and first, second, and third secondary multicast/broadcast control information blocks (S-MCIBs) 614

(i.e., S-MCIB 1), 616 (i.e., S-MCIB 2), and 618 (i.e., S-MCIB 3) for the first, second, and third MBSs, respectively. The SC P-MCIB 608 is transmitted based on single-cell transmission, and the MC P-MCIB 610 is transmitted based on multi-cell transmission. The S-MCIB 614, 616, or 618 is transmitted based on the transmission mode of its corresponding MBS. Furthermore, an MBS, e.g., the third MBS, may not have MC P-MCIB. In such situation, that MBS may operate in a manner similar to the method 300 (FIG. 3).

In exemplary embodiments, the SCIB 606, the SC P-MCIB 608, and the S-MCIBs 614, 616, and 618 operate similarly to the SCIB 506, the SC P-MCIB 508, and the S-MCIBs 514, 516, and 518 (FIG. 5), respectively. In the illustrated embodiment shown in FIG. 6, an arrow pointing from a first channel to a second channel is used to illustrate that the first channel may contain schedule information for the second channel.

Different from the method 500 (FIG. 5), the method 600 may use one MC P-MCIB for a plurality of MBSs based on multi-cell transmission. For example, the MC P-MCIB 610 may contain MBS control information for the first and second MBSs. In addition, the MC P-MCIB 610 may contain MBS control information for a fourth MBS, which is not provided by the present base station but by other base stations providing the fourth MBS based on multi-cell transmission.

In exemplary embodiments, the SCIB 606 may contain schedule information for the MC P-MCIB 610. Therefore, based on the SCIB 606, the subscriber station may be able to determine when and/or where to read the MC P-MCIB 610. In addition, the SC P-MCIB 608 may contain schedule information for the MC P-MCIB 610. Therefore, based on the SC P-MCIB 608, the subscriber station may be able to determine when and/or where to read the MC P-MCIB 610. These exemplary alternatives are represented by the dashed arrows in FIG. 6.

In exemplary embodiments, non-cell-specific MBS control information may be transmitted on the MC P-MCIB 610. For example, modulation and coding parameters, schedule information for S-MCIBs transmitted based on multi-cell transmission, session start/stop indicators, radio bearer information, etc, are typically considered as non-cell-specific MBS control information, and may be transmitted on the MC P-MCIB 610.

In exemplary embodiments, the SC P-MCIB 608 may contain schedule information for S-MCIBs, such as the S-MCIBs 614 and 616, respectively, for the first and second MBSs based on multi-cell transmission. In other words, based on the SC P-MCIB 608, the subscriber station may be able to determine when and/or where to read the S-MCIB 614 or 616. As a result, an MBS provided based on multi-cell transmission, such as the first MBS, may not need an MC P-MCIB. In addition, the MC P-MCIB 610 may contain schedule information for the S-MCIBs 614 and 616. In other words, based on the MC P-MCIB 610, the subscriber station may be able to determine when and/or where to read the S-MCIB 614 for the first MBS, or the S-MCIB 616 for the second MBS. As a result, an MBS provided based on multi-cell transmission, such as the first MBS, may not need an SC P-MCIB. In such situation, the MBS may operate in a manner similar to the method 300 (FIG. 3).

In exemplary embodiments, the SC P-MCIB 608 may contain schedule information for an MC P-MCIB such as the MC P-MCIB 610, which may contain schedule information for an S-MCIB, e.g., the S-MCIB 614 or 616. Therefore, for example, based on the SC P-MCIB 608, the subscriber station may be able to determine when and/or where to read the MC P-MCIB 610 and, based on the MC P-MCIB 610, the subscriber station may be able to determine when and/or where to read the S-MCIB 614 or 616.

In exemplary embodiments, the SCIB 606 may contain schedule information for the MC P-MCIB 610, which may contain schedule information for the S-MCIB 614 or 616. Therefore, for example, based on the SCIB 606, the subscriber station may be able to determine when and/or where to read the MC P-MCIB 610. Based on the MC P-MCIB 610, the subscriber station may be able to determine when and/or where to read the S-MCIB 614 or 616. The above-described exemplary alternatives are represented by the dashed arrows in FIG. 6.

In exemplary embodiments, an S-MCIB may include a change indicator based on which the subscriber station may be able to determine whether MBS control information transmitted on an SC P-MCIB and/or an MC P-MCIB is changed. For example, the S-MCIB 614 may include a change indicator, based on which the subscriber station may be able to determine whether MBS control information for the first MBS transmitted on the SC P-MCIB 608 and/or the MC P-MCIB 610 is changed.

Alternatively, an S-MCIB may include multiple change indicators. For example, the S-MCIB 614 may include an SC P-MCIB change indicator, based on which the subscriber station may be able to determine whether MBS control information of the first MBS transmitted on the SC P-MCIB 608 is changed, and an MC P-MCIB change indicator, based on which the subscriber station may be able to determine whether MBS control information for the first MBS transmitted on the MC P-MCIB 610 is changed.

When the subscriber station wants to receive, e.g., the first MBS, the subscriber station may search for a first available SCIB to read. In one exemplary embodiment, the subscriber station may read the SCIB 606 for system information for receiving the first MBS and/or schedule information for the SC P-MCIB 608. The subscriber station may then read the SC P-MCIB 608 for MBS control information including schedule information for the MC P-MCIB 610. In another exemplary embodiment, the SCIB 606 may contain MBS control information that would otherwise be transmitted on the SC P-MCIB 608. Therefore the subscriber station may read the SCIB 606 to obtain MBS control information including schedule information for the MC P-MCIB 610. The subscriber station may then read the MC P-MCIB 610 for additional MBS control information including schedule information for the S-MCIB 614. Still in another exemplary embodiment, the SCIB 606 may contain schedule information for the SC P-MCIB 608 and the MC P-MCIB 610. Therefore the subscriber station may then read the SC P-MCIB 608 for MBS control information and read the MC P-MCIB 610 for additional MBS control information. At least one of the SC P-MCIB 608 and the MC P-MCIB 610 may include schedule information for the S-MCIB 614. The subscriber station may further read the S-MCIB 614 at a first time t1 and the MBS data bursts 604-1 corresponding to the S-MCIB 614 at t1, and read the S-MCIB 614 at a second or next time t2 and the MBS data bursts (not shown) corresponding to the S-MCIB 614 at t2. Similarly, the subscriber station may continue to read the S-MCIB 614 at following times and corresponding MBS data bursts (not shown). As the S-MCIB→data→S-MCIB→data . . . process continues, the subscriber station may receive the first MBS.

In exemplary embodiments, when the subscriber station wants to receive an MBS which does not have an MC P-MCIB, e.g., the third MBS, the subscriber station may search for a first available SCIB to read. In one exemplary embodiment, the subscriber station may read the SCIB 606 for system information for receiving the third MBS and/or schedule information for the SC P-MCIB 608. The subscriber station may then read the SC P-MCIB 608 for MBS control information including schedule information for the S-MCIB 618. In another exemplary embodiment, the SCIB 606 may contain MBS control information that would otherwise be transmitted on the SC P-MCIB 608. Therefore, the subscriber station may read the SCIB 606 to obtain MBS control information including schedule information for the S-MCIB 618. The subscriber station may further read the S-MCIB 618 at a first time t1" and the MBS data bursts 604-3 corresponding to the S-MCIB 618 at t1", and read the S-MCIB 618 at a second or next time t2" and the MBS data bursts (not shown) corresponding to the S-MCIB 618 at t2". Similarly, the subscriber station may continue to read the S-MCIB 618 at following times and corresponding MBS data bursts (not shown). As the S-MCIB→data→S-MCIB→data . . . process continues, the subscriber station may receive the third MBS.

In exemplary embodiments (not shown), when the subscriber station wants to receive an MBS which does not have an SC P-MCIB, the subscriber station may search for a first available SCIB to read. For example, the subscriber station may read the SCIB for schedule information for an MC P-MCIB. The subscriber station may then read the MC P-MCIB for MBS control information including schedule information for an S-MCIB. The subscriber station may further read the S-MCIB at a first time t1'" and MBS data bursts corresponding to the S-MCIB at t1'", and read the S-MCIB at a second or next time t2'" and MBS data bursts corresponding to the S-MCIB at t2'". Similarly, the subscriber station may continue to read the S-MCIB at following times and corresponding MBS data bursts. As the S-MCIB→data→S-MCIB→data . . . process continues, the subscriber station may receive the MBS.

In one exemplary embodiment, when the subscriber station reads an S-MCIB, such as the S-MCIB 614 at t2, and identifies that a change indicator is set or an error happens, the subscriber station may be able to determine that information transmitted on the SC P-MCIB 608 and/or the MC P-MCIB 610 is changed. Accordingly, the subscriber station may search for a next available SCIB to read. After the subscriber station reads the next available SCIB and its corresponding SC P-MCIB and/or MC P-MCIB so as to update MBS control information, the subscriber station may continue the S-MCIB→data→S-MCIB→data . . . process to receive the first MBS. In another embodiment, when the subscriber station reads an S-MCIB, such as the S-MCIB 614 at t2, and identifies that a change indicator is set, the S-MCIB 614 at t2 may already include updated MBS control information. In such situation, the subscriber station may update MBS control information from the S-MCIB 614 directly and continue the S-MCIB→data→S-MCIB→data . . . process to receive the MBS.

In exemplary embodiments, the subscriber station may encounter errors when receiving an SCIB, an SC P-MCIB, an MC P-MCIB, and/or an S-MCIB. In such embodiments, the subscriber station may restart the above process, i.e., read a next available SCIB and its corresponding SC P-MCIB and/or MC P-MCIB, and then continue the S-MCIB→data→S-MCIB→data . . . process to receive an MBS.

In exemplary embodiments, the methods 300 (FIG. 3), 400 (FIG. 4), 500 (FIG. 5), and 600 (FIG. 6) may be used for a base station with one radio frequency (RF) carrier or multiple RF carriers. The RF carriers may have the same bandwidth, e.g. a 5, 10, 20, or 40 MHz bandwidth, or different bandwidths, and may be contiguous or non-contiguous. The RF carriers may also belong to different frequency bands. In addition, the RF carriers may be of different duplex modes, e.g. frequency division duplex (FDD), time division duplex (TDD), etc., or a mix of bidirectional and broadcast only carriers. For example, for a base station with multiple RF carriers, a first one of the multiple RF carriers may be used as a general carrier, and a second one of the multiple RF carriers may be used as a dedicated carrier for MBSs. The methods 300 (FIG. 3), 400 (FIG. 4), 500 (FIG. 5), and 600 (FIG. 6) may be used for the first and/or second RF carriers.

Figure 7:
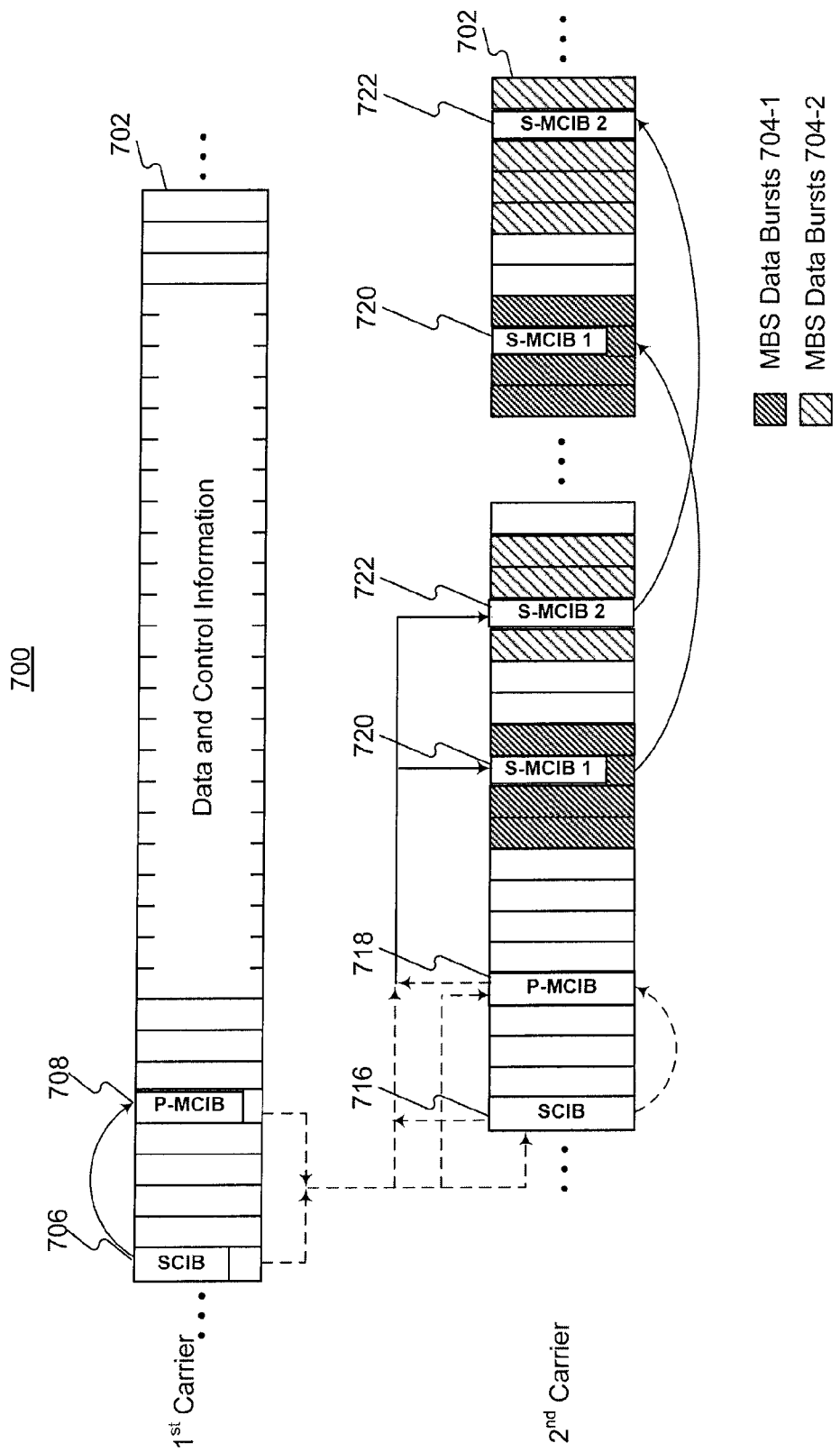
FIG. 7 illustrates a method for a base station with multiple radio frequency carriers to provide MBSs in a communication system, according to an exemplary embodiment.

FIG. 7 illustrates a method 700 for a base station with multiple RF carriers to provide MBSs in a communication system, according to an exemplary embodiment. The base station may transmit signals 702 including, e.g., downlink control messages and MBS data, on first and second RF carriers. For example, the first RF carrier may be a general carrier, and the second RF carrier may be a dedicated carrier for MBSs. The base station may or may not provide MBSs on the first RF carrier. A subscriber station may receive the signals 702 and, hence, read the MBS data in order to receive an MBS. For illustrative purposes only, only MBS data bursts 704-1 and 704-2 representing content data of first and second MBSs, respectively, are shown in FIG. 7.

In exemplary embodiments, a first plurality of logical channels, i.e., information blocks, such as an SCIB 706 and a P-MCIB 708, may be transmitted on the first RF carrier. A second plurality of logical channels, such as an SCIB 716, a P-MCIB 718, and first and second S-MCIB 720 (i.e., S-MCIB 1) and 722 (i.e., S-MCIB 2), which operate in a manner similar to the SCIB 306, the P-MCIB 308, and the S-MCIBs 310 and 312 (FIG. 3), respectively, may be transmitted on the second RF carrier. In the illustrated embodiment shown in FIG. 7, an arrow pointing from a first channel to a second channel is used to illustrate that the first channel may contain schedule information for the second channel.

In exemplary embodiments, control information on the first RF carrier, e.g., information transmitted on at least one of the SCIB 706 and the P-MCIB 708, may contain resource and schedule information for S-MCIBs, e.g., the S-MCIBs 720 and 722, on the second RF carrier. Based on the SCIB 706 and/or the P-MCIB 708 on the first RF carrier, the subscriber station may be able to determine when and/or where to read the S-MCIB 720 or 722 on the second RF carrier. As a result, the subscriber station may continue to read the S-MCIB 720 or 722 on the second RF carrier, and to read corresponding MBS data bursts to thereby receive the first or second MBS. In such embodiment, the SCIB 716 and the P-MCIB 718 may not be transmitted on the second RF carrier.

Alternatively, the control information on the first RF carrier, e.g., the information transmitted on at least one of the SCIB 706 and the P-MCIB 708, may contain an RF carrier description, e.g., a center frequency, a bandwidth, synchronization signal information, etc, for the second RF carrier, and/or resource and schedule information for the SCIB 716 on the second RF carrier. Based on the SCIB 706 and/or the P-MCIB 708 on the first RF carrier, the subscriber station may be able to read the SCIB 716 on the second RF carrier. As a result, the subscriber station may continue to read the P-MCIB 718 and the S-MCIB 720 or 722 on the second RF carrier, and to read corresponding MBS data bursts to thereby receive the first or second MBS.

Still alternatively, the control information on the first RF carrier, e.g., the information transmitted on at least one of the SCIB 706 and the P-MCIB 708, may contain resource and schedule information for the P-MCIB 718 on the second RF carrier. Based on the SCIB 706 and/or the P-MCIB 708, the subscriber station may be able to determine when and/or where to read the P-MCIB 718 on the second RF carrier. As a result, the subscriber station may continue to read the S-MCIB 720 or 722 on the second RF carrier, and to read corresponding MBS data bursts to thereby receive the first or second MBS. The above-described exemplary alternatives are represented by the dashed arrows in FIG. 7.

In one exemplary embodiment, when the subscriber station reads an S-MCIB and identifies that a change indicator is set, or encounters errors in receiving an SCIB, a P-MCIB, and/or an S-MCIB, the subscriber station may restart the above process to receive an MBS. In another exemplary embodiment, when the subscriber station reads an S-MCIB and identifies that a change indicator is set, the S-MCIB may already include updated MBS control information. In such embodiment, the subscriber station may update MBS control information from the S-MCIB directly and continue the S-MCIB→data→S-MCIB→data . . . process to receive the MBS.

Figure 8:
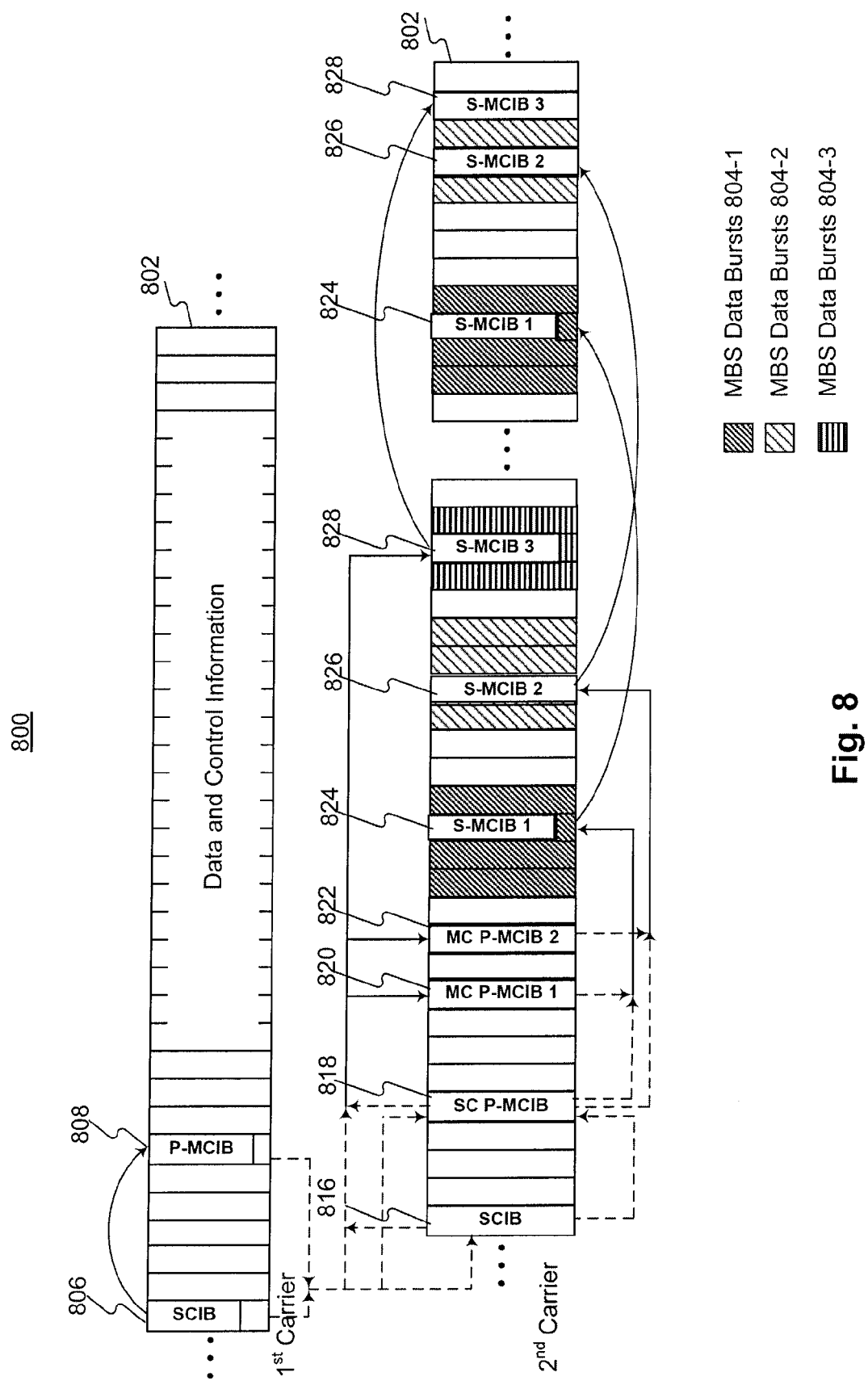
FIG. 8 illustrates a method for a base station with multiple radio frequency carriers to provide MBSs in a communication system, according to an exemplary embodiment.

FIG. 8 illustrates a method 800 for a base station with multiple RF carriers to provide MBSs in a communication system, according to an exemplary embodiment. The base station may transmit signals 802 including, e.g., downlink control messages and MBS data, on first and second RF carriers. For example, the first RF carrier may be a general carrier, and the second RF carrier may be a dedicated carrier for MBSs. The base station may or may not provide MBS services on the first RF carrier. A subscriber station may receive the signals 802 and, hence, read the MBS data in order to receive an MBS. For illustrative purposes only, only MBS data bursts 804-1, 804-2, and 804-3 representing content data of first, second, and third MBSs, respectively, are shown in FIG. 8. For example, the first and second MBSs may each be provided based on multi-cell transmission, and the third MBS may be provided based on single-cell or multi-cell transmission.

In exemplary embodiments, a first plurality of logical channels, i.e., information blocks, such as an SCIB 806 and a P-MCIB 808, may be transmitted on the first RF carrier. A second plurality of logical channels, such as an SCIB 816, an SC P-MCIB 818, MC P-MCIBs 820 (i.e., MC P-MCIB 1) and 822 (i.e., MC P-MCIB 2), and S-MCIBs 824 (i.e., S-MCIB 1), 826 (i.e., S-MCIB 2), and 828 (i.e., S-MCIB 3), which operate in a manner similar to the SCIB 506, the SC P-MCIB 508, the MC P-MCIBs 510 and 512, and the S-MCIBs 514, 516, and 518 (FIG. 5), respectively, may be transmitted on the second RF carrier. In the illustrated embodiment shown in FIG. 8, an arrow pointing from a first channel to a second channel is used to illustrate that the first channel may contain schedule information for the second channel.

In exemplary embodiments, control information on the first RF carrier, e.g., information transmitted on at least one of the SCIB 806 and the P-MCIB 808, may contain resource and schedule information for S-MCIBs, e.g., the S-MCIB 828, and/or the MC-MCIBs, e.g., the MC-MCIBs 820 and 822, which may further contain schedule information for S-MCIBs, e.g., the S-MCIBs 824 and 826, respectively. Based on the SCIB 806 and/or the P-MCIB 808 on the first RF carrier, the subscriber station may be able to determine when and/or where to read the S-MCIB 828 or the MC-MCIB 820 or 822 on the second RF carrier. As a result, for example, if the subscriber station wants to receive the first MBS, the subscriber station may further read the MC-MCIB 820 and the S-MCIB 824 on the second RF carrier, and to read corresponding MBS data bursts to thereby receive the first MBS. In such embodiment, the SCIB 816 and/or the SC P-MCIB 818 may not be transmitted on the second RF carrier.

Alternatively, the control information on the first RF carrier, e.g., the information transmitted on at least one of the SCIB 806 and the P-MCIB 808, may contain an RF carrier description, e.g., a center frequency, a bandwidth, synchronization signal information, etc, for the second RF carrier, and/or resource and schedule information for the SCIB 816 on the second RF carrier. Based on the SCIB 806 and/or the P-MCIB 808 on the first RF carrier, the subscriber station may be able to read the SCIB 816 on the second RF carrier. As a result, for example, if the subscriber station wants to receive the first MBS, the subscriber station may further read the SC-MCIB 818, the MC-MCIB 820, and/or the S-MCIB 824 on the second RF carrier, and to read corresponding MBS data bursts to thereby receive the first MBS.

Still alternatively, the control information on the first RF carrier, e.g., the information transmitted on at least one of the SCIB 806 and the P-MCIB 808, may contain resource and schedule information for the SC-MCIB 818 on the second RF carrier. Based on the SCIB 806 and/or the P-MCIB 808 on the first RF carrier, the subscriber station may be able to determine when and/or where to read the SC-MCIB 818 on the second RF carrier. As a result, for example, if the subscriber station wants to receive the first MBS, the subscriber station may further read the MC-MCIB 820 and the S-MCIB 824 on the second RF carrier, and to read corresponding MBS data bursts to thereby receive the first MBS. The above-described exemplary alternatives are represented by dashed arrows in FIG. 8.

In one exemplary embodiment, when the subscriber station reads an S-MCIB and identifies that a change indicator is set, or encounters errors in receiving an SCIB, an SC P-MCIB, an MC P-MCIB, and/or an S-MCIB, the subscriber station may re-start the above process to receive an MBS. In another exemplary embodiment, when the subscriber station reads an S-MCIB and identifies that a change indicator is set, the S-MCIB may already include updated MBS control information. In such embodiment, the subscriber station may update MBS control information from the S-MCIB directly and continue the S-MCIB→data→S-MCIB→data . . . process to receive the MBS.

Figure 9:
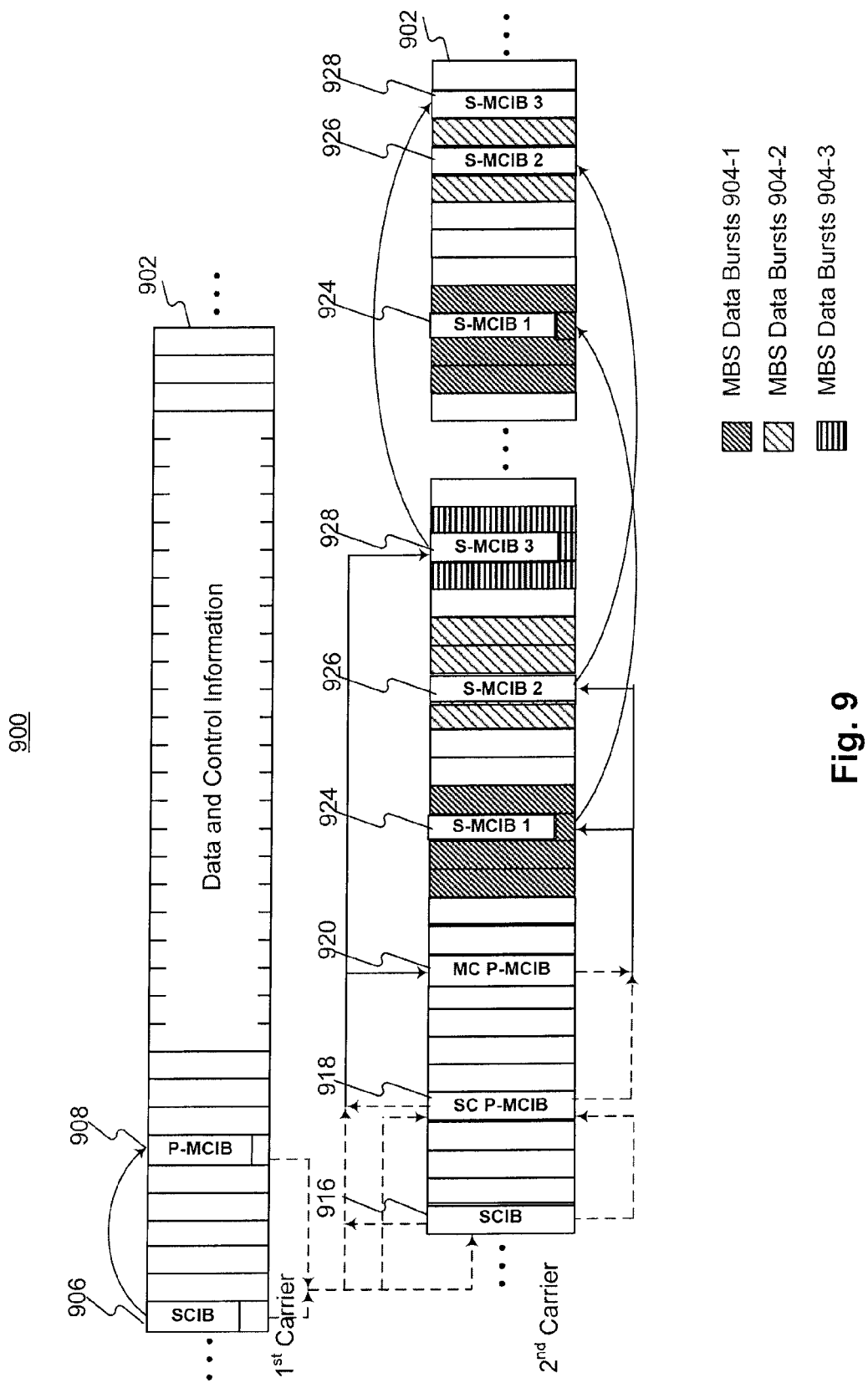
FIG. 9 illustrates a method for a base station with multiple radio frequency carriers to provide MBSs in a communication system, according to an exemplary embodiment.

FIG. 9 illustrates a method 900 for a base station with multiple RF carriers to provide MBSs in a communication system, according to an exemplary embodiment. The base station may transmit signals 902 including, e.g., downlink control messages and MBS data, on first and second RF carriers. For example, the first RF carrier may be a general carrier, and the second RF carrier may be a dedicated carrier for MBSs. The base station may or may not provide MBS services on the first RF carrier. A subscriber station may receive the signals 902 and, hence, read the MBS data in order to receive an MBS. For illustrative purposes only, only MBS data bursts 904-1, 904-2, and 904-3 representing content data of first, second, and third MBSs, respectively, are shown in FIG. 9. For example, the first and second MBSs may each be provided based on multi-cell transmission, and the third MBS may be provided based on single-cell or multi-cell transmission.

In exemplary embodiments, a first plurality of logical channels, i.e., information blocks, such as an SCIB 906 and a P-MCIB 908, may be transmitted on the first RF carrier. A second plurality of logical channels, such as an SCIB 916, an SC P-MCIB 918, an MC P-MCIB 920, and S-MCIBs 924 (i.e., S-MCIB 1), 926 (i.e., S-MCIB 2), and 928 (i.e., S-MCIB 3), which operate in a manner similar to the SCIB 606, the SC P-MCIB 608, the MC P-MCIB 610, and the S-MCIBs 614, 616, and 618 (FIG. 6), respectively, may be transmitted on the second RF carrier. In the illustrated embodiment shown in FIG. 9, an arrow pointing from a first channel to a second channel is used to illustrate that the first channel may contain schedule information for the second channel.

In exemplary embodiments, control information on the first RF carrier, e.g., information transmitted on at least one of the SCIB 906 and the P-MCIB 908, may contain resource and schedule information for S-MCIBs, e.g., the S-MCIB 928, and/or MC-MCIBs, e.g., the MC-MCIB 920, wherein the MC-MCIB 920 may further contain schedule information for S-MCIBs, e.g., the S-MCIBs 924 and 926. Based on the SCIB 906 and/or the P-MCIB 908 on the first RF carrier, the subscriber station may be able to determine when and/or where to read the S-MCIB 928 or the MC-MCIB 920 on the second RF carrier. As a result, for example, if the subscriber station wants to receive the first MBS, the subscriber station may further read the MC-MCIB 920 and the S-MCIB 924 on the second RF carrier, and to read corresponding MBS data bursts to thereby receive the first MBS. In such embodiment, the SCIB 916 and/or the SC P-MCIB 918 may not be transmitted on the second RF carrier.

Alternatively, the control information on the first RF carrier, e.g., the information transmitted on at least one of the SCIB 906 and the P-MCIB 908, may contain an RF carrier description, e.g., a center frequency, a bandwidth, synchronization signal information, etc, for the second RF carrier, and/or resource and schedule information for the SCIB 916 on the second RF carrier. Based on the SCIB 906 and/or the P-MCIB 908 on the first RF carrier, the subscriber station may be able to read the SCIB 916 on the second RF carrier. As a result, for example, if the subscriber station wants to receive the first MBS, the subscriber station may further read the SC-MCIB 918, the MC-MCIB 920, and the S-MCIB 924 on the second RF carrier, and to read corresponding MBS data bursts to thereby receive the first MBS.

Still alternatively, the control information on the first RF carrier, e.g., the information transmitted on at least one of the SCIB 906 and the P-MCIB 908, may contain resource and schedule information for the SC-MCIB 918 on the second RF carrier. Based on the SCIB 906 and/or the P-MCIB 908 on the first RF carrier, the subscriber station may be able to determine when and/or where to read the SC-MCIB 918 on the second RF carrier. As a result, for example, if the subscriber station wants to receive the first MBS, the subscriber station may further read the MC-MCIB 920 and the S-MCIB 924 on the second RF carrier, and to read corresponding MBS data bursts to thereby receive the first MBS. The above-described exemplary alternatives are represented by dashed arrows in FIG. 9.

In one exemplary embodiment, when the subscriber station reads an S-MCIB and identifies that a change indicator is set, or encounters errors in receiving an SCIB, an SC P-MCIB, an MC P-MCIB, and/or an S-MCIB, the subscriber station may restart the above process to receive an MBS. In another exemplary embodiment, when the subscriber station reads an S-MCIB and identifies that a change indicator is set, the S-MCIB may already include updated MBS control information. In such embodiment, the subscriber station may update MBS control information from the S-MCIB directly and continue the S-MCIB→data→S-MCIB→data . . . process to receive the MBS.

Figure 10:
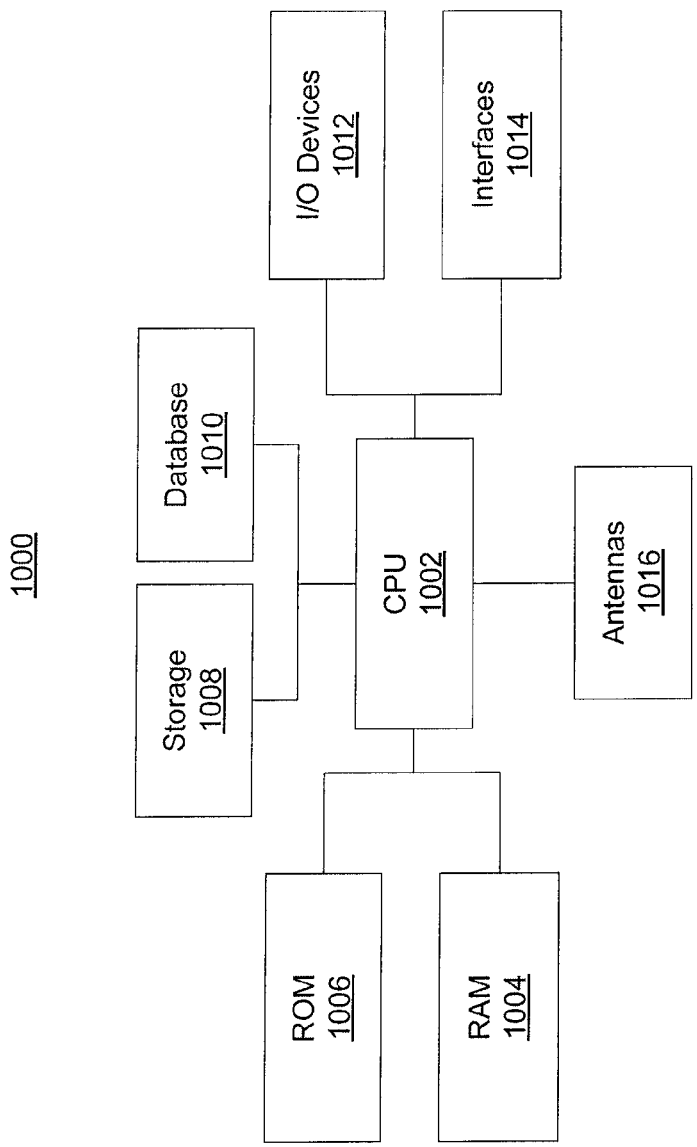
FIG. 10 illustrates a block diagram of an exemplary base station, according to an exemplary embodiment.

FIG. 10 illustrates a block diagram of an exemplary base station 1000, according to an exemplary embodiment. For example, the base station 1000 may be the base station noted above in explanation of the methods 300-900 (FIG. 3-FIG. 9). Referring to FIG. 10, the base station 1000 may include one or more of the following components: at least one processor or central processing unit (CPU) 1002 configured to execute computer program instructions to perform various processes and methods, random access memory (RAM) 1004 and read only memory (ROM) 1006 configured to access and store information and computer program instructions, storage 1008 to store data and information, databases 1010 to store tables, lists, or other data structures, I/O devices 1012, interfaces 1014, antennas 1016, etc. Each of these components is well-known in the art and will not be discussed further. In exemplary embodiments, the processor or CPU 1002 determines different information, such as system information, RF carrier information, MBS control information, or schedule information, for transmission on the above-described different channels.

Figure 11:
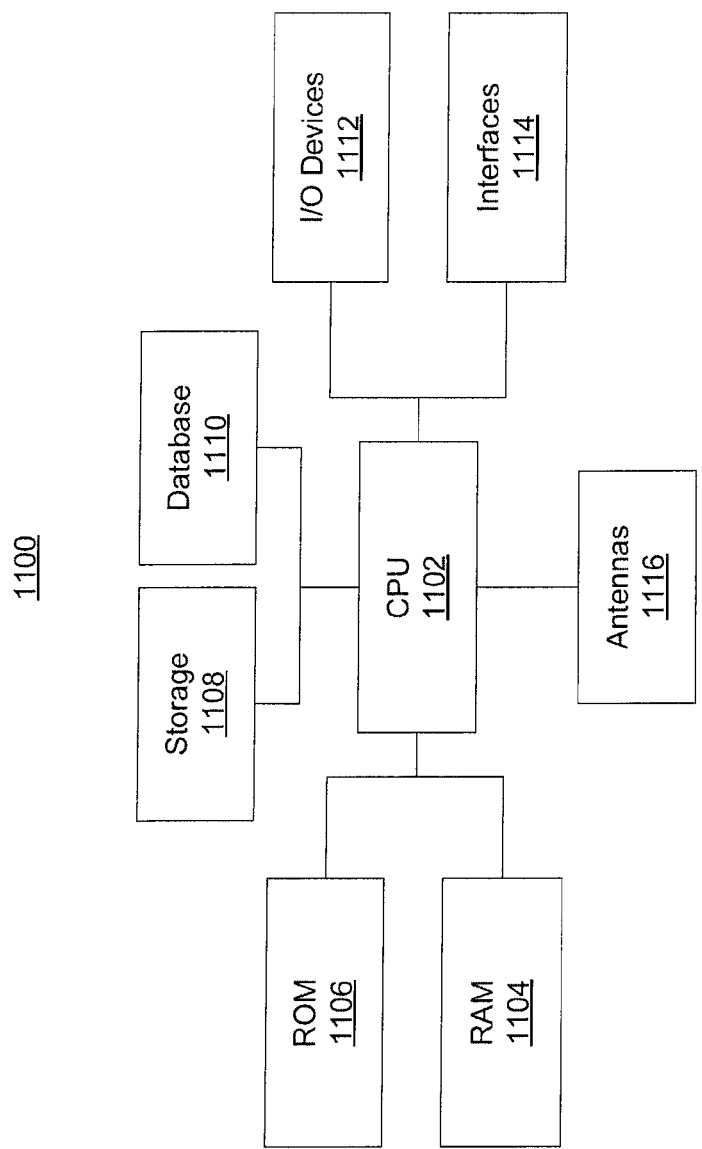
FIG. 11 illustrates a block diagram of an exemplary subscriber station, according to an exemplary embodiment.

FIG. 11 illustrates a block diagram of an exemplary subscriber station 1100, according to an exemplary embodiment. For example, the subscriber station 1100 may be the subscriber station noted above in explanation of the methods 300-900 (FIG. 3-FIG. 9). Referring to FIG. 11, the subscriber station 1100 may include one or more of the following components: at least one processor or central processing unit (CPU) 1102 configured to execute computer program instructions to perform various processes and methods, random access memory (RAM) 1104 and read only memory (ROM) 1106 configured to access and store information and computer program instructions, storage 1108 to store data and information, databases 1110 to store tables, lists, or other data structures, I/O devices 1112, interfaces 1114, antennas 1116, etc. Each of these components is well-known in the art and will not be discussed further.

In one exemplary embodiment, an SCIB may be a broadcast control channel (BCCH). In another exemplary embodiment, an MCIB may be a multicast control channel (MCCH).

While embodiments have been described based on two or three MBSs, the invention is not so limited. It may be practiced with equal effectiveness with any number of MBSs.

Other embodiments of the invention will be apparent to those skilled in the art from consideration of the specification and practice of the invention disclosed herein. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for a base station to provide a multicast and/or broadcast service (MBS) in a communication system, comprising:
   transmitting system information on a system control information block (SCIB);
   transmitting contents of MBS control information that is updated at a first rate on a primary multicast/broadcast control information block (P-MCIB), wherein the contents of the MBS control information that is updated at the first rate comprise at least modulation and coding parameter;
   transmitting contents of the MBS control information that is updated at a second rate, higher than the first rate, on a secondary multicast/broadcast control information block (S-MCIB), wherein the contents of the MBS control information that is updated at the second rate do not comprise modulation and coding parameter; and transmitting MBS content data based on the MBS control information transmitted on the S-MCIB.

2. The method of claim 1, further comprising transmitting schedule information for the P-MCIB on the SCIB.

3. The method of claim 1, further comprising transmitting schedule information for the S-MCIB on at least one of the SCIB and the P-MCIB.

4. The method of claim 1, further comprising transmitting the contents of the MBS control information that is updated at the first rate on the SCIB.

5. The method of claim 1, wherein the transmitting of the contents of the MBS control information that is updated at the second rate further comprises:

transmitting schedule information for the MBS content data.

6. The method of claim 1, further comprising transmitting schedule information for the S-MCIB on the SCIB.

7. The method of claim 1, further comprising:

transmitting, on the S-MCIB at a current time, schedule information for the S-MCIB at a future time.

8. The method of claim 1, further comprising:

transmitting a change indicator on the S-MCIB to indicate an update of MBS control information.

9. The method of claim 8, further comprising:

transmitting updated MBS control information on the S-MCIB.

10. The method of claim 1, further comprising multiplexing the S-MCIB or transmitting the S-MCIB with data bursts including the MBS content data.

11. The method of claim 1, further comprising transmitting the S-MCIB using a transmission mode of the MBS.

12. The method of claim 1, further comprising transmitting the P-MCIB based on single-cell transmission or multi-cell transmission.

13. The method of claim 1, wherein the P-MCIB is a first P-MCIB, the method further comprising:

transmitting non-cell-specific MBS control information on a second P-MCIB.

14. The method of claim 13, further comprising transmitting schedule infonnation for the second P-MCIB on at least one of the SCIB and the first P-MCIB.

15. The method of claim 13, further comprising transmitting schedule information for the S-MCIB on at least one of the first P-MCIB and the second P-MCIB.

16. The method of claim 13, wherein the base station is a first base station in the communication system, and a second base station in the communication system transmits the same non-cell-specific MBS control information, the method further comprising:

transmitting, by the first base station, the non-cell-specific MBS control information at substantially the same time as the second base station transmits the non-cell-specific MBS control information.

17. The method of claim 13, wherein the base station is a first base station in the communication system, and a second base station in the communication system also transmits a schedule information for the content data of the MBS, the method further comprising:

transmitting, by the first base station, the schedule information at substantially the same time as the second base station transmits the schedule information.

18. A base station to provide a multicast and/or broadcast service (MBS) in a communication system, comprising:

a memory configured to store instructions; and a processor, the processor being configured to execute the instructions to:

determine system information for transmission on a system control information block (SCIB);

determine contents of MBS control information that is updated at a first rate for transmission on a primary multicast/broadcast control information block (P-MCIB), wherein the contents of the MBS control information that is updated at the first rate comprise at least modulation and coding parameter; and determine contents of the MBS control information that is updated at a second rate, higher than the first rate, for transmission on a secondary multicast/broadcast control information block (S-MCIB),wherein the contents of the MBS control information that is updated at the second rate do not comprise modulation and coding parameter.

19. The base station of claim 18, wherein the processor is further configured to execute the instructions to:

determine the contents of the MBS control information that is updated at the first rate for transmission on the SCIB.

20. The base station of claim 18, wherein the P-MCIB is a first P-MCIB, the processor being further configured to execute the instructions to:

determine non-cell-specific MBS control information for transmission on a second P-MCIB.

21. A method for a base station to provide a multicast and/or broadcast service (MBS) in a communication system, wherein the base station includes at least first and second radio frequency (RF) carriers, the method comprising:

transmitting system information on a system control information block (SCIB) on the first RF carrier;

transmitting contents of MBS control information that is updated at a first rate on a primary multicast/broadcast control information block (P-MCIB), wherein the contents of the MBS control information that is updated at the first rate comprise at least modulation and coding parameter;

transmitting contents of the MBS control information that is updated at a second rate, higher than the first rate, on a secondary multicast/broadcast control information block (S-MCIB) on the second RF carrier, wherein the contents of the MBS control information that is updated at the second rate do not comprise modulation and coding parameter; and transmitting MBS content data on the second RF carrier based on the MBS control information.

22. The method of claim 21, further comprising:

transmitting, on the SCIS on the first RF carrier, resource and schedule information for the S-MCIB on the second RF carrier.

23. The method of claim 21, further comprising:

transmitting, on the P-MCIB on the first RF canier, resource and schedule information for the S-MCIB on the second RF carrier.

24. The method of claim 21, further comprising:

transmitting, on at least one of the SCIB and the P-MCIB on the first RF carrier, an RF carrier description for the second RF carrier.

25. The method of claim 21, further comprising:

transmitting the contents of the MBS control information that is updated at the first rate on a P-MCIB on the second RF carrier; and transmitting, on at least one of the SCIB and the P-MCIB on the first RF carrier, resource and schedule information for the P-MCIB on the second RF carrier.

26. The method of claim 21, further comprising:
transmitting system information on an SCIB on the second RF carrier; and
transmitting, on at least one of the P-MCIB and the SCIB on the first RF carrier, resource and schedule information for the SCIB on the second RF carrier.

27. The method of claim 21, further comprising:
transmitting, on the SCIB on the first RF carrier, an RF carrier description for the second RF carrier.

28. The method of claim 21, further comprising:
transmitting the contents of the MBS control information that is updated at the first rate on the P-MCIB on the second RF collier; and
transmitting, on the SCIB on the first RF carrier, resource and schedule information for the P-MCIB on the second RF carrier.

29. The method of claim 21, further comprising:
transmitting system information on an SCIB on the second RF carrier; and
transmitting, on the SCIB on the first RF carrier, resource and schedule information for the SCIB on the second RF carrier.

30. The method of claim 21, wherein the transmitting of the contents of the MBS control information that is updated at the second rate further comprises:
transmitting schedule information for the MBS content data.

31. The method of claim 21, further comprising:
transmitting, on the S-MCIB at a current time, schedule information for the S-MCIB at a future time.

32. The method of claim 21, further comprising:
transmitting a change indicator on the S-MCIB to indicate an update of MBS control information.

* * * * *